United States Patent [19]
Data et al.

[11] Patent Number: 5,469,820
[45] Date of Patent: Nov. 28, 1995

[54] AUXILIARY POWER UNIT FOR A HYBRID ELECTRICAL VEHICLE

[75] Inventors: Stanley E. Data, Ramsey; Robert P. Koziara, Lake Elmo; Mark S. Lent, Brooklyn Park; Patrick A. O'Gorman, Brooklyn Center; Thomas K. Rose, Plymouth; Eugene G. Shanks, Blaine; Daniel A. Norrick, Anoka, all of Minn.

[73] Assignee: Onan Corporation, Minneapolis, Minn.

[21] Appl. No.: 376,043

[22] Filed: Jan. 20, 1995

Related U.S. Application Data

[63] Continuation of Ser. No. 93,536, Jul. 15, 1993, abandoned.
[51] Int. Cl.[6] .................................................. F02B 75/06
[52] U.S. Cl. ................................. 123/192.2; 123/195 E
[58] Field of Search .......................... 123/192.2, 195 E, 123/149 R

[56] References Cited

U.S. PATENT DOCUMENTS

| | | |
|---|---|---|
| 322,310 | 7/1885 | Miles . |
| 1,011,778 | 12/1911 | Harhorn . |
| 1,179,779 | 4/1916 | Uhl . |
| 1,749,883 | 11/1926 | Ledwinka . |
| 1,784,133 | 12/1930 | Decker . |
| 1,893,629 | 1/1933 | Masterson et al. . |
| 2,137,738 | 11/1938 | Faubion . |
| 2,153,523 | 4/1939 | Roberts et al. . |

(List continued on next page.)

FOREIGN PATENT DOCUMENTS

| | | |
|---|---|---|
| 637117 | 2/1962 | Canada . |
| 886890 | 11/1971 | Canada . |
| 920454 | 2/1973 | Canada . |
| 920455 | 2/1973 | Canada . |
| 920456 | 2/1973 | Canada . |
| 920457 | 2/1973 | Canada . |
| 920458 | 2/1973 | Canada . |
| 1210245 | 10/1970 | United Kingdom . |
| 1210246 | 10/1970 | United Kingdom . |
| 1210247 | 10/1970 | United Kingdom . |
| 1210248 | 10/1970 | United Kingdom . |
| 1210249 | 10/1970 | United Kingdom . |
| 1210250 | 10/1970 | United Kingdom . |

OTHER PUBLICATIONS

Onan, "Onan MicroLite Gen Set Selling Guide" (2 pages), published 1989.
Onan, "Our Generators Keep Running, So you Won't Have To" (4 pages), published 1991.
Onan, "The Critical Link" (4 pages), published 1991.
Onan, "Keep Your Business On the Road" (4 pages), published 1990.
Onan, "Onan Emerald Plus RV–GenSets" (4 pages), published 1989.
Onan, "Introducing Cummins/Onan Quiet Site Generators" (4 pages), published 1990.
Onan, "Marquis GenSets" (6 pages), published 1990.
Onan, "Onan RV GenSets, Because You've Got Enough to Worry About on the Road" (6 pages), published 1988.
Onan, "Few Things Have Given Boaters, More Dependable Service than Onan" (4 pages), published 1988.
Onan, "Horizontal & Vertical Shaft" (8 pages), published 1987.
Onan, "Gasoline Engines" (6 pages), published 1988.
Onan, "Your Connection to Emergency/Standby Power" (6 pages), published 1991.
"The Vibrationless Engine" published in Automobile Engineer, Aug., 1970 (Exhibit A).
"How to Make Vibrationless Engines" by Victor Heron & Associates, 25 Colonial Crescent, Oakville, Ontario, Canada L6J 4K8 (Exhibit B).

*Primary Examiner*—Noah P. Kamen
*Attorney, Agent, or Firm*—Merchant, Gould, Smith, Edell, Welter & Schmidt

[57] ABSTRACT

An auxiliary power system includes an engine balance system, an integrated alternator/starter, a thermal management system, noise-vibration-harshness control system, an emissions/fuel economy system, an APU master control unit, and a vehicle control system.

3 Claims, 22 Drawing Sheets

U.S. PATENT DOCUMENTS

| | | |
|---|---|---|
| 2,256,035 | 9/1941 | Potter . |
| 2,383,996 | 9/1945 | Stucke . |
| 2,462,182 | 2/1949 | Guerdan et al. . |
| 2,564,741 | 8/1951 | Vermillion . |
| 2,955,750 | 10/1960 | Phelps . |
| 3,185,876 | 5/1965 | Broziat . |
| 3,842,287 | 10/1974 | Nakamura . |
| 4,056,746 | 11/1977 | Burtis . |
| 4,084,445 | 4/1978 | Erwin . |
| 4,098,252 | 7/1978 | Abthoff et al. . |
| 4,099,589 | 7/1978 | Williams . |
| 4,172,434 | 10/1979 | Coles . |
| 4,195,613 | 4/1980 | Bratt et al. . |
| 4,274,382 | 6/1981 | Sugasawa et al. . |
| 4,291,233 | 9/1981 | Kirschbaum . |
| 4,382,188 | 5/1983 | Cronin . |
| 4,425,989 | 1/1984 | Gotoda . |
| 4,489,695 | 12/1984 | Kohama et al. . |
| 4,496,020 | 1/1985 | Mitsuishi . |
| 4,535,744 | 8/1985 | Matsumura . |
| 4,538,481 | 9/1985 | Ohta et al. . |
| 4,556,026 | 12/1985 | Masuda et al. . |
| 4,608,952 | 9/1986 | Morita et al. . |
| 4,628,876 | 12/1986 | Fujikawa et al. . |
| 4,699,097 | 10/1987 | Tanaka et al. . |
| 4,722,308 | 2/1988 | Wall . |
| 4,900,992 | 2/1990 | Sekizawa . |
| 4,958,095 | 9/1990 | Uchida et al. . |
| 4,963,804 | 10/1990 | Geiger . |
| 4,984,480 | 1/1991 | Gormley . |
| 5,034,638 | 7/1991 | McCabria . |
| 5,038,731 | 8/1991 | Shimada . |
| 5,057,725 | 10/1991 | Kasai et al. . |
| 5,057,726 | 10/1991 | Mole et al. . |
| 5,087,230 | 2/1992 | Yates et al. . |
| 5,105,776 | 4/1992 | Tsuchiya et al. . |
| 5,121,715 | 6/1992 | Nogami et al. . |
| 5,172,784 | 12/1992 | Varela, Jr. . |
| 5,214,358 | 5/1993 | Marshall . |
| 5,264,764 | 11/1993 | Kuang . |

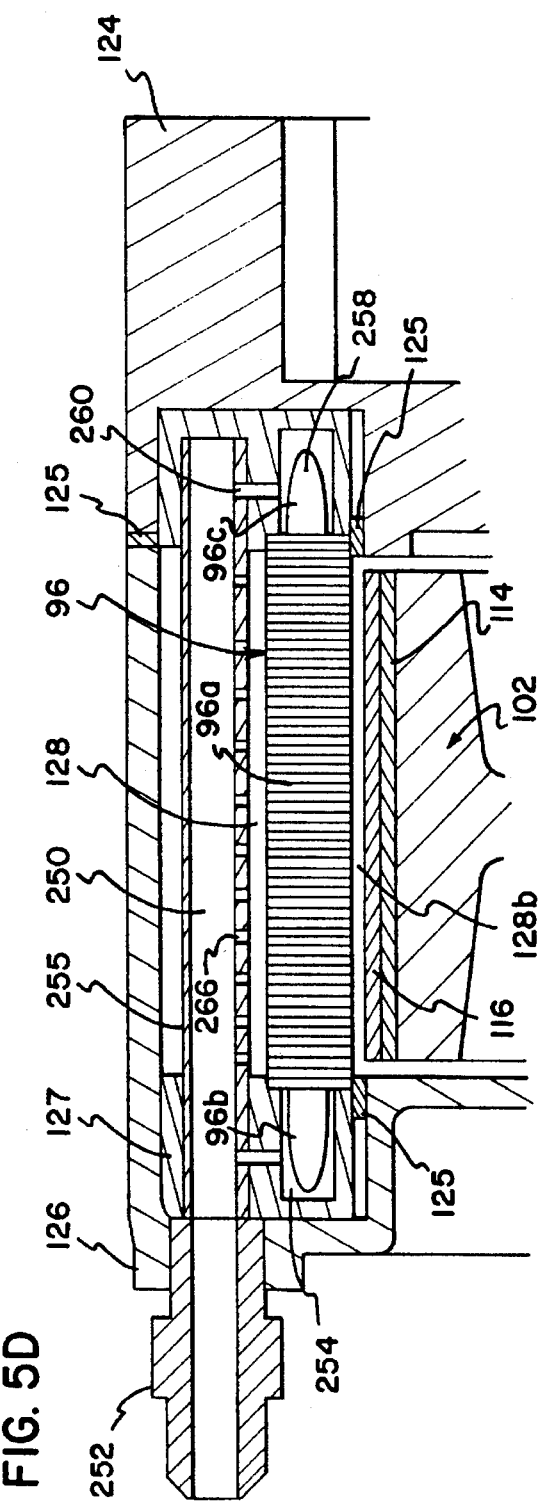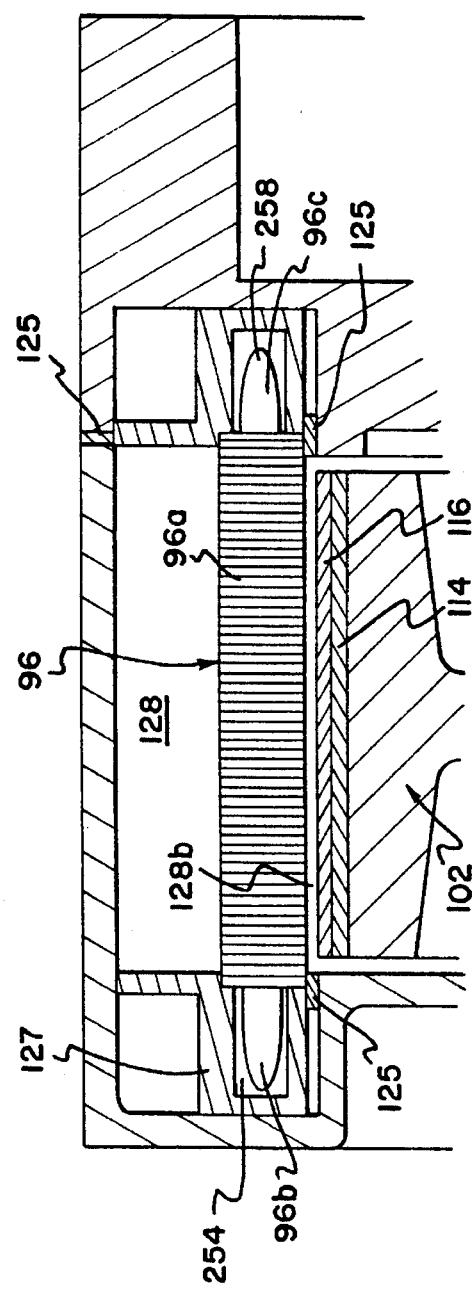

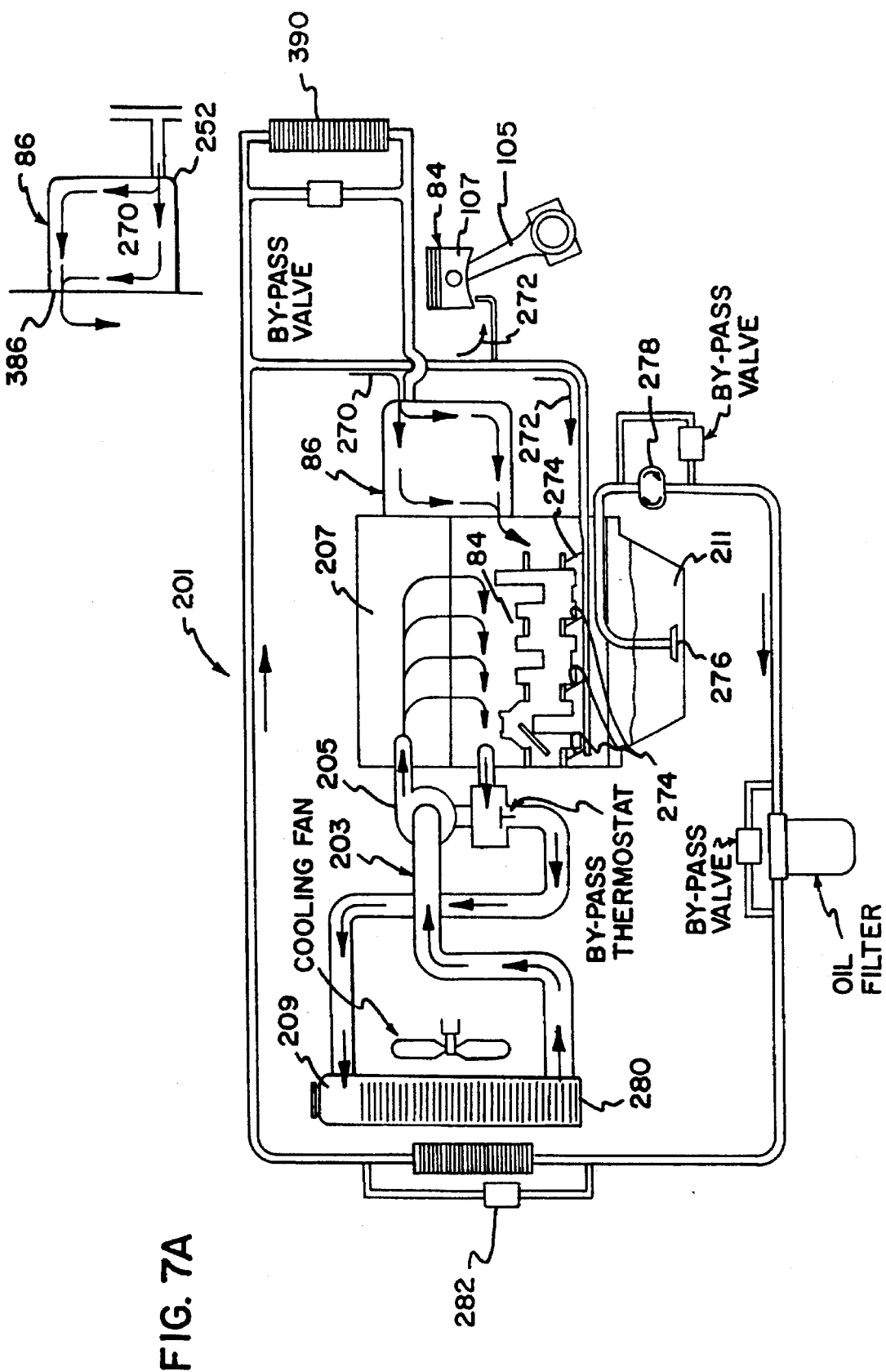

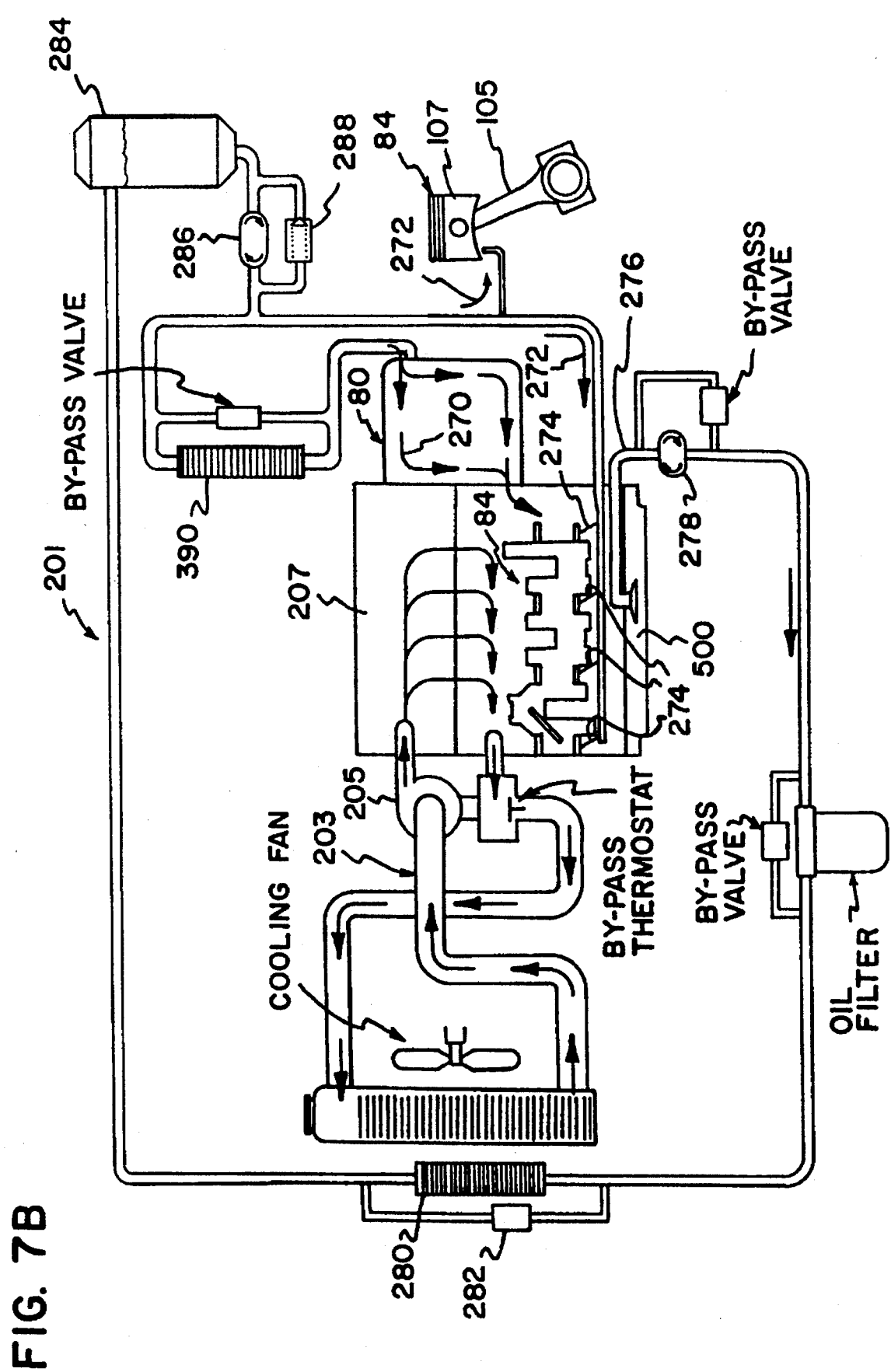

AUXILIARY POWER UNIT FOR A HYBRID ELECTRICAL VEHICLE

This is a Continuation application of application Ser. No. 08/093,536, filed Jul. 15, 1993, now abandoned.

FIELD OF THE INVENTION

The present invention relates to an internal combustion engine based auxiliary power unit for a hybrid electric vehicle.

BACKGROUND OF THE INVENTION

IC engine powered vehicles have been commercially marketed for about one hundred years and dominate the vehicle industry. Despite their widespread use, gasoline fueled IC engines have been associated with environmental problems from exhaust emissions and exhibit low fuel efficiency under light load operation and high emission under transient loads.

Electric vehicles are an alternative to combustion engine powered vehicles when minimizing vehicle exhaust emissions is a primary goal. However, pure electric vehicles developed to date have limited range of operation without battery recharging. Typical limitations also include special electric power requirements for recharging the vehicle's batteries.

Because of these pure electric vehicle shortcomings, efforts have been directed toward the development of hybrid electric vehicles. Hybrid electric vehicles are viewed as a workable compromise between conventional engine powered vehicles and pure electric vehicles. The hybrid electric vehicle in this invention is powered by batteries, and an auxiliary power unit comprised of an IC engine driven electric alternator. This combination increases driving range compared with pure electric vehicles while achieving improve fuel economy and lower exhaust emission when compared to conventional technology.

However, current hybrid electric vehicles have several limitations in the areas of noise and vibration control, emission control and thermal management. These problems limit the chance for commercial success. A major concern in a hybrid electric vehicle are annoying vibration caused by pitch, yaw, and roll torques, which are generated by cyclic irregularities of IC engines. Another concern is the high noise level of the APU when compared with electric motors. Yet another concern is thermal management of the IC engine and alternator when located in a restricted space. Still another concern of a hybrid electric vehicle is the emission control requirement. More efficient combustion and effective emission control are required to have a practical hybrid electric vehicle that meets future emission standards.

The present invention addresses these and other shortcomings, which when combined together into a highly integrated APU system by optimized design, minimizes concerns and limited acceptance of prior art.

SUMMARY OF THE INVENTION

The present invention relates to an auxiliary power unit for a hybrid electric vehicle, which minimizes vibration and noise caused by cyclic engine torques, cyclic alternator/starter torques, and cyclic forces from the engine and alternator/starter assembly.

A preferred embodiment also minimizes vibration and noise caused by exhaust, induction, and noise radiation from the engine and alternator/starter assembly of the auxiliary power unit.

In one embodiment of an auxiliary power unit, a rotor of an alternator/starter is mounted on a balance shaft which is coupled to an engine crankshaft by a gear assembly. The balance shaft/rotor combination rotates in a direction opposite to that of the crankshaft. The engine and the alternator/starter are configured and arranged to have a zero net angular momentum which results in the auxiliary power unit not imparting any primary pitch, primary yaw, or roll torques to its mounting structure. In particular, the rotating parts in the auxiliary power unit are configured and arranged to have a zero net angular momentum, which eliminates roll torques.

One embodiment of an auxiliary power unit for a hybrid electric vehicle generally in accordance with the principles of the present invention comprises:

a IC engine driving a crankshaft;

a balance shaft;

gear means for interconnecting the crankshaft to the balance shaft to cause the balance shaft to be rotated in a direction opposite to that of the crankshaft;

an alternator/starter positioned on an end of the balance shaft; and wherein a net angular momentum of the auxiliary power unit is zero.

One embodiment of an auxiliary power system includes the auxiliary power unit, a sensor unit for sensing the energy level of batteries so that the auxiliary power unit automatically starts operating when the energy level of the batteries is low. An APU master control unit controls the operation of the auxiliary power system to meet the power requirement, noise reduction requirements emissions requirements, or other requirements of the hybrid electric vehicle.

One embodiment of a hybrid electric vehicle comprises:

a battery assembly providing electricity to the hybrid electric vehicle;

auxiliary power unit, electrically connected to the battery assembly, for charging the battery assembly when the battery assembly needs charging;

noise control means for controlling noise from the auxiliary power unit which affects exterior and interior vehicle noise levels;

vibration control means for controlling vibration levels of the vehicle;

cooling control means for cooling the alternator/starter and the engine of the auxiliary power unit, and for ventilating air from the auxiliary power unit, the cooling control means including an alternator/starter oil sealing means for preventing cooling oil from leaking into the alternator/starter causing viscous drag, the cooling control system using a shared engine lubrication system;

emission control means for controlling the exhausting of exhausted gases from the auxiliary power unit;

battery charging means for providing initial engine cranking power and battery charging power;

electronic engine control means for controlling the battery charging means and an engine operating parameters of the hybrid electric vehicle, and reduced maintenance by elimination of external belts and pullies, and limitation of contact of the alternator with water and other cooling contaminates by a sealed design using oil cooling; and wherein the auxiliary power unit comprises:

a IC engine driving a crankshaft;

the alternator/starter positioned on an end of a balance shaft;

gear means for interconnecting the crankshaft to the balance shaft to cause the balance shaft to be rotated in a direction opposite that of the crankshaft;

wherein a net angular momentum of the auxiliary power unit is zero.

In one embodiment of a hybrid electric vehicle in accordance with the principles of the present invention, an auxiliary power unit is installed in the hybrid electric vehicle. All shaking forces as well as primary pitch, primary yaw, and roll torques produced by the auxiliary power unit are eliminated.

In yet another embodiment, a hybrid electric vehicle includes a noise, vibration, and harshness attenuation system so that the noise, vibration, and harshness of the auxiliary power unit are attenuated and masked.

In one embodiment, a hybrid electric vehicle includes an emission control system so that fuel is efficiently combusted, and exhausted emission are effectively reduced.

In one embodiment, a hybrid electric vehicle includes a cooling control system. The cooling control system includes water cooling system and oil cooling system to reduce the high temperature created by the auxiliary power unit.

In one embodiment, a hybrid electric vehicle includes a battery charging system, which includes a three-phase bi-directional inverter which is interconnected to the alternator/starter providing initial engine cranking power and controlling alternator/starter output power, current, and voltage.

In one embodiment, a hybrid electric vehicle includes a propulsion control system for monitoring and controlling operation of the auxiliary power unit.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views:

FIG. 5D is a partially enlarged cross-sectional view of FIG. 5;

FIG. 5E is a partially enlarged cross-sectional view of FIG. 5 being transactionally rotated 45 degrees;

FIG. 7A is a schematic diagram of an embodiment of a cooling system utilized with the auxiliary power unit;

FIG. 7B is a schematic diagram of another embodiment of a cooling system utilized with the auxiliary power unit;

FIG. 7C is a partially schematic diagram of the reversed alternator/starter cooling system;

DETAILED DESCRIPTION OF THE PREFERRED EMBODIMENT

Hybrid Electric Vehicle General Information

In FIGS. 1 through 4, there is shown an embodiment of an integrated auxiliary power unit 80 in accordance with the principles of the present invention. In the embodiment disclosed, the auxiliary power unit 80 is a very compact unit including a three-cylinder combustion engine 84 and an alternator/starter 86 disposed in a common housing 82. The alternator/starter 86 is mounted on a crankshaft of the combustion engine 84. It will be appreciated that the auxiliary power unit 80 might include combustion engines having different numbers of cylinder(s), e.g., one, two, three, four, etc. The auxiliary power unit 80 has a very low profile. In addition, it has no external belts and has no flywheels.

In one embodiment the combustion engine 84 might be a three-cylinder, four-cycle engine having an inline configuration. The engine might have the following detailed features: spark ignition, 74×78 mm bore & stroke, 9.75:1 compression ratio, in-head combustion chamber with 10–20% squish area, closed loop sequential port fuel injection, A/F ratio of 14.7:1, 76% mechanical efficiency, and 29% thermal efficiency. The fuel might be current available pump fuel M&E 15 & reformulated gasoline. Other versions of the engine might use M&E 85 Liquid Propane or Compressed Natural Gas. It will of course be appreciated that other engines having varying features might be used in keeping with the principles of the invention.

Alternator/starter and Engine Cooling System

Figure 4:
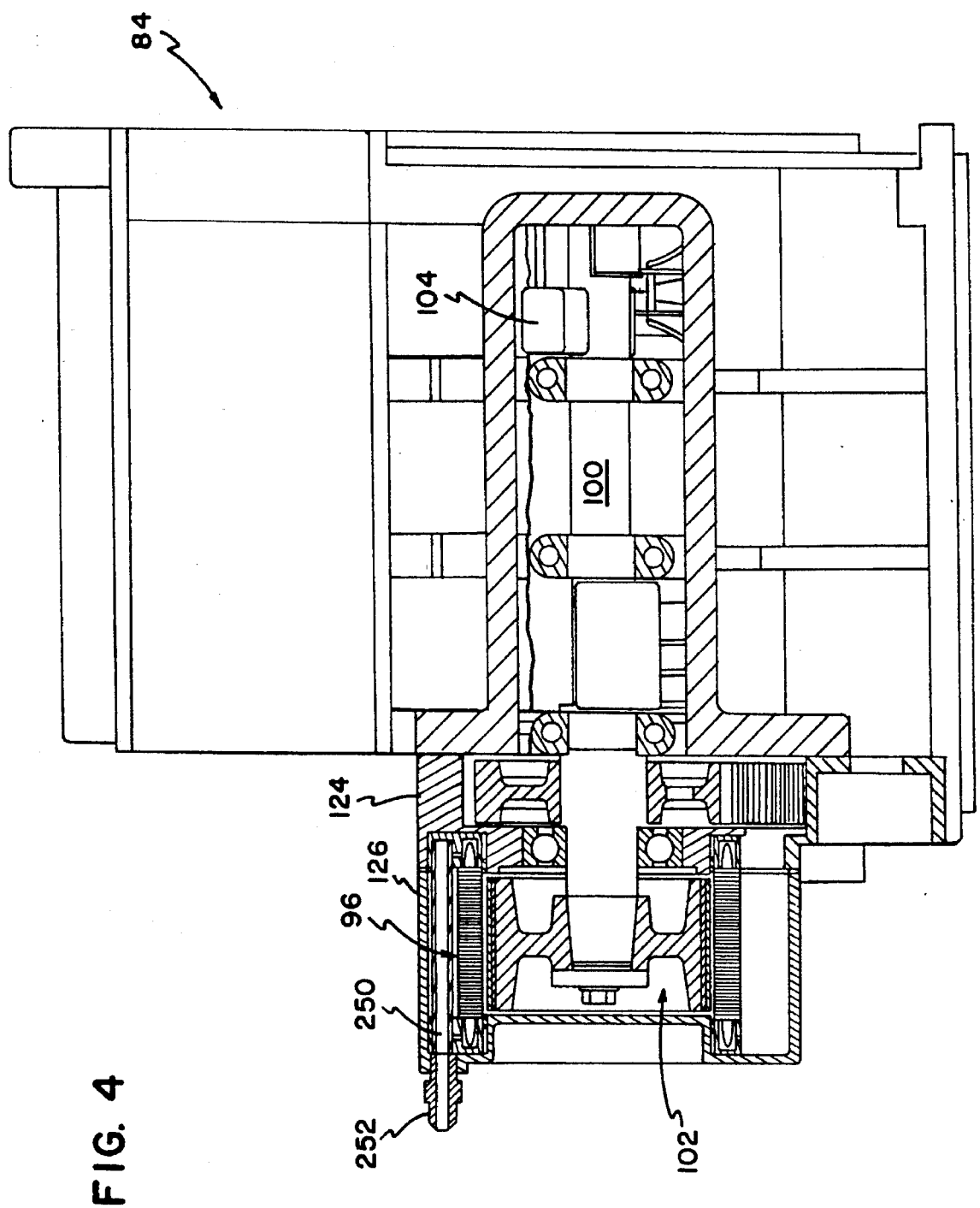
FIG. 4 is a cross-sectional plane view of the auxiliary power unit.
Figure 5A:
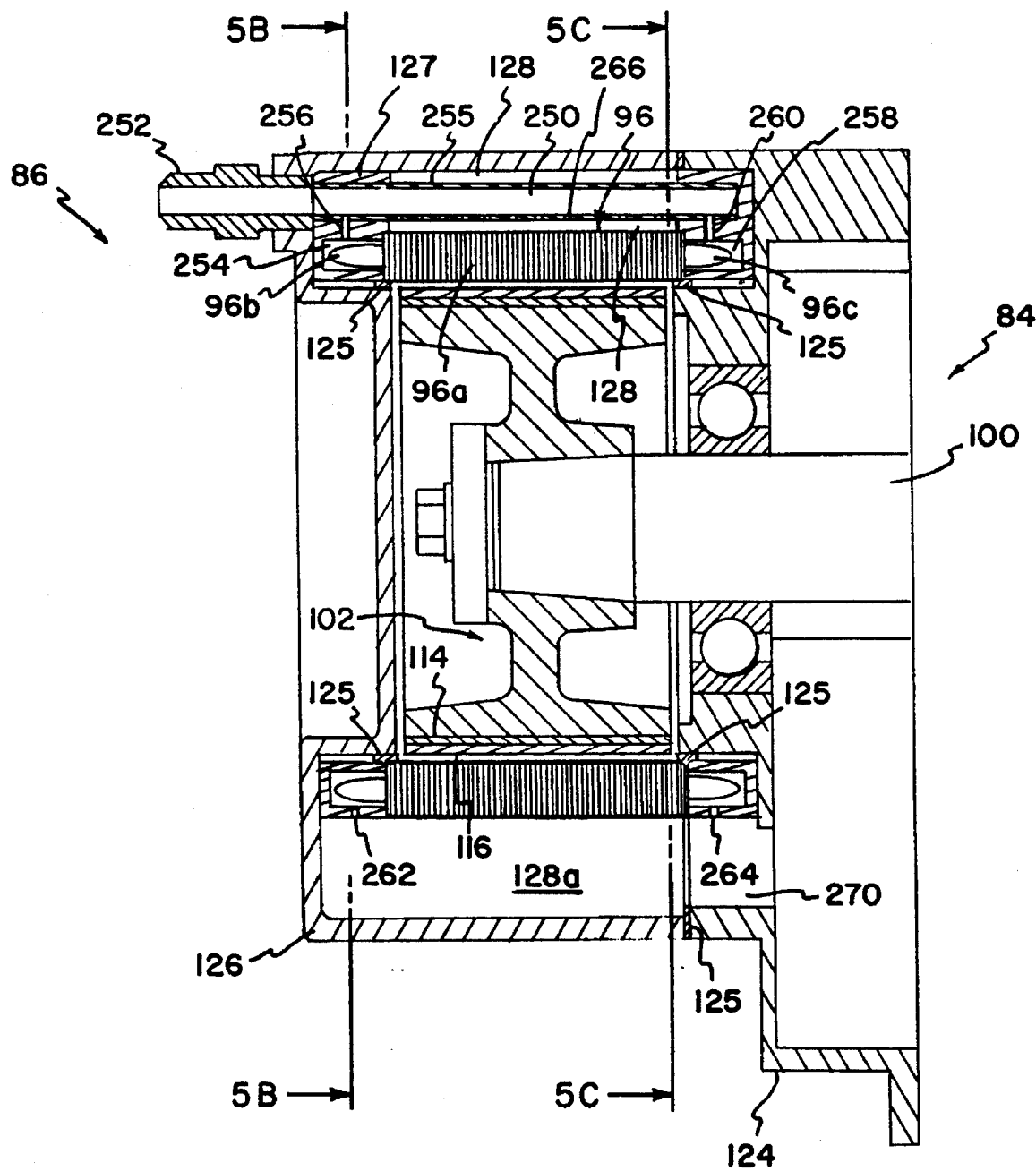
FIG. 5A is a cross-sectional view of a rotor of an alternator/starter positioned on the end of a balance shaft.

As shown in FIGS. 4 and 5A, the rotor 102 of the preferred embodiment is constructed of a steel hub 112, which is taper fit to the balance shaft 100. Separate, high coercivity, permanent magnets 114 are evenly spaced and adhesively bonded to the periphery of the rotor 102. The magnets 114 are further retained against the centrifugal forces by a shrink fit nonmagnetic band 116. It is appreciated that other processes can be used in addition to the shrink fit to install the nonmagnetic band 116. The magnets 114 of the rotor 102 are preferably magnetized in place as an assembly.

The stator 96 is preferably constructed of die punched, steel laminations stacked on a mandrel and axially welded on the outside diameter of a core to form a lamination winding stack 96a of the stator 96. In one embodiment, the material of the laminations is a 29 gauge, high grade, non-oriented silicon steel. It is appreciated that the laminations can be made of any other type of gauge, or grades of material. A three phase winding, preferably copper or aluminum wire, is wound in slots insulated with high temperature, dielectric insulating material to form the stator winding. It is appreciated that any other number of phase windings can be used in the present invention. The winding assembly is impregnated with a high temperature and high strength epoxy resin, selected to provide protection against an oil cooling environment, which includes entrained moisture and other engine lubricating oil contaminants. Oil cooling allows the alternator/starter 86 to be completely sealed and eliminates concern about highly variable air cooling contaminants.

The stator 96 is secured to the combustion engine 84 by piloting the stator 96 between an alternator/starter frame enclosure casting 126 and an engine gear case cover 124 so as to maintain clearance between the stator 96 and rotor 102. A plurality of gaskets 125 are sealed between the alternator/starter frame enclosure casting 126 and the gear case cover 124 so that no cooling oil leaks into the alternator/starter 86. Two stator winding end turns 96b, 96c are located at each end of the winding stack 96a. The alternator/starter frame enclosure casting 126 and the gear case cover 124 are provided with a plastic cooling distribution end cap 127 around each of the stator winding end turns 96b,96c. A cooling oil passageway 250 allows cooling oil flowing from an oil inlet 252 into an annulus 254 around the end turn 96b through an opening 256 of the cooling distribution end cap 127. The cooling oil passageway 250 also allows the cooling oil to flow across the back of the stator stack 96a and into another annulus 258 around the end turn 96c on the opposite side through an opening 260 of the cooling distribution end cap 127. The cooling oil flows along the annulus 254 and 258 to the bottom exits 262 and 264 of the cooling distribution end cap 127. Along the passageway 250 across the back of the stator stack 96a, there is also an inner annulus 128 which is disposed between the passageway 250 and the stator stack 96a. The passageway 250 is defined as an oil pipe 255, which connects with the two cooling distribution end caps 127 on either end of the machine. The oil pipe 255 also includes a plurality of holes 266 along the passageway across the stator stack 96a so that a portion of cooling oil flows through the holes 266 into the annulus 128.

Figure 5B:
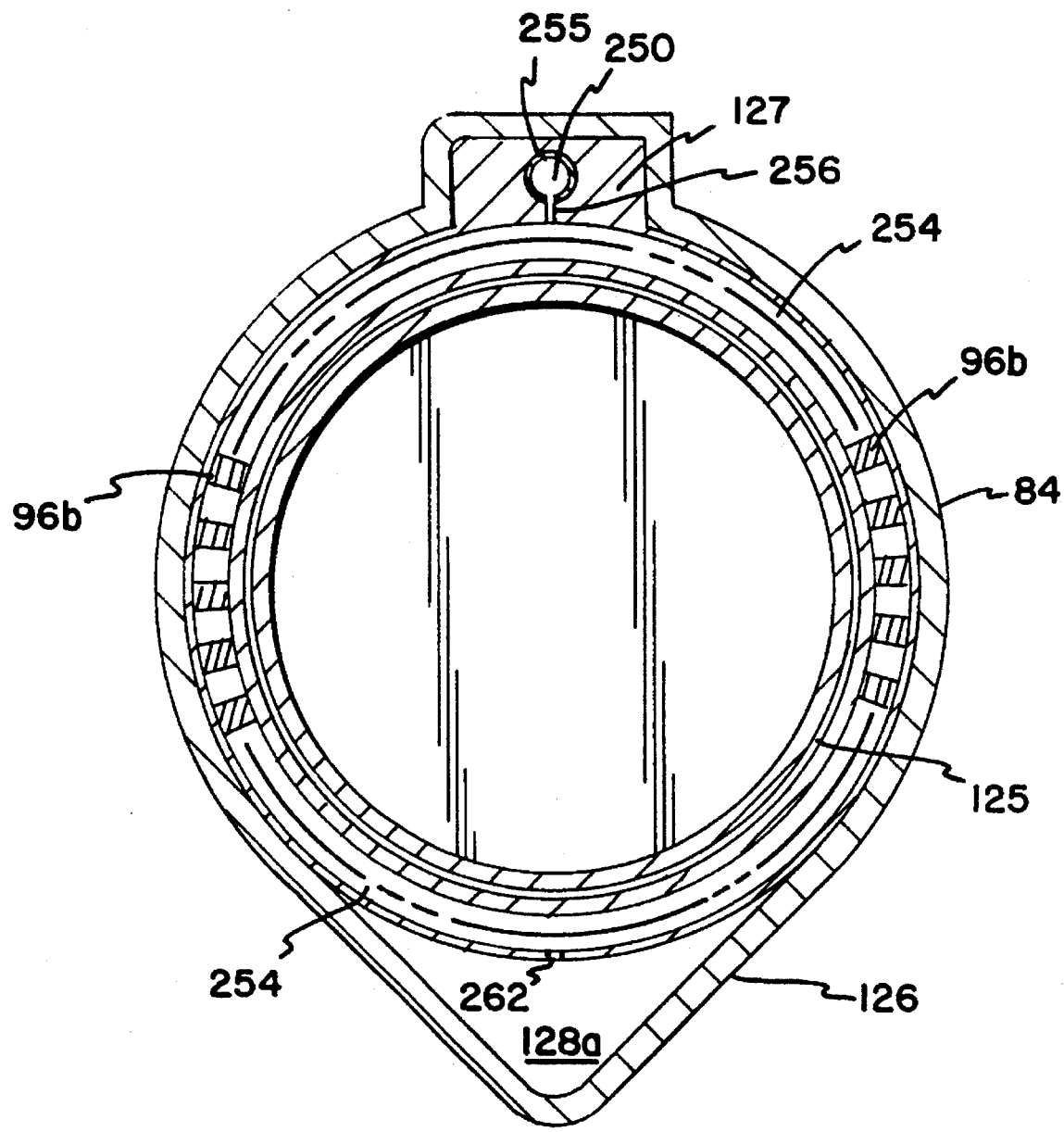
FIG. 5B is a cross-sectional view along the line 5B—5B in FIG. 5.

FIG. 5B also shows a cross-sectional view of the annulus 128 with oil flowing from one of the holes 266 and flowing out into a collecting sump 128a at an exit 270. The annulus 128 is sized so that the cooling oil fills the annulus 128 so as to effectively transfer the heat from the stator stack 96a.

Figure 5C:
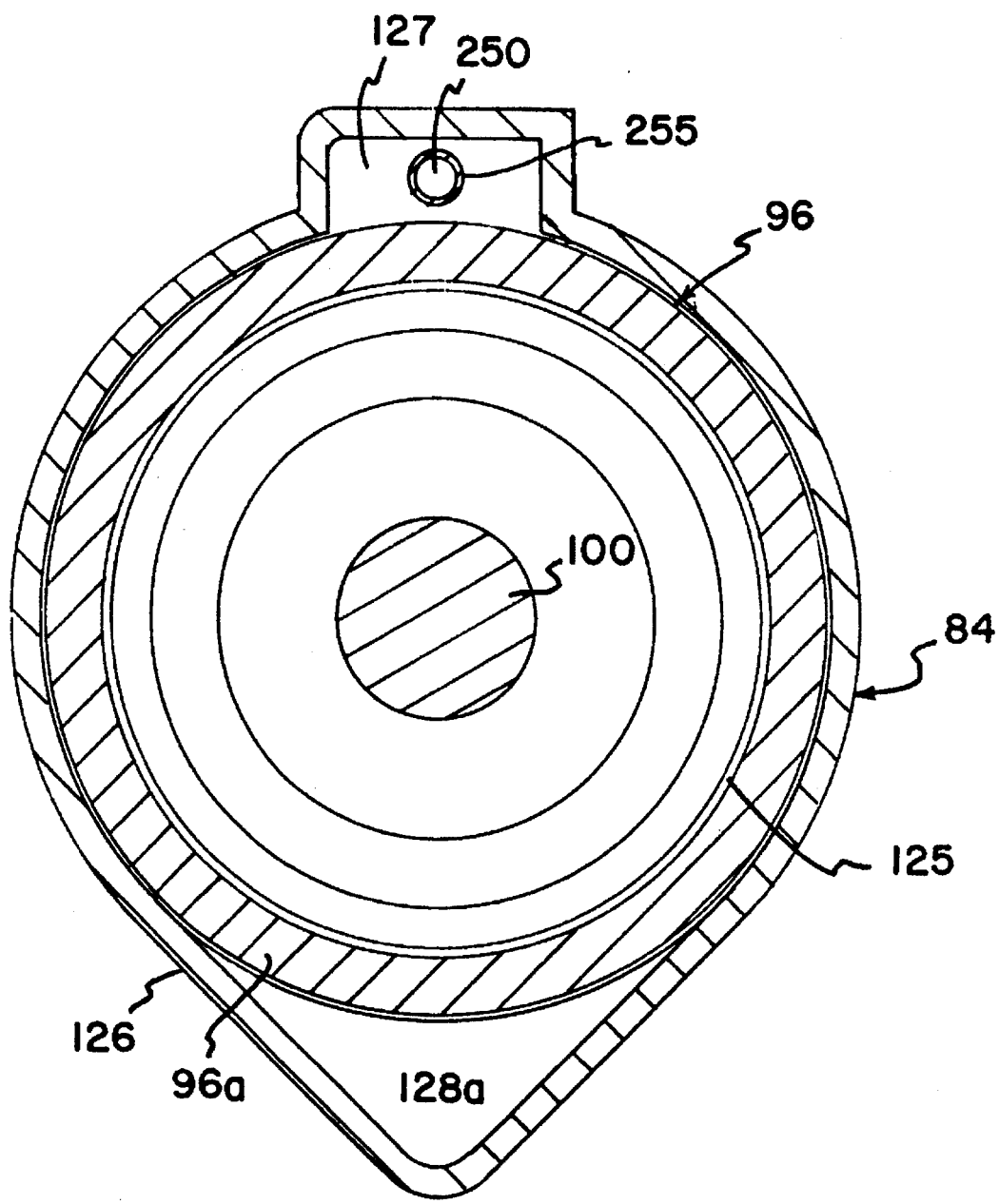
FIG. 5C is a cross-sectional view along the line 5C—5C in FIG. 5.

FIG. 5C shows a cross-sectional view of the annulus 254 around the end turn 96b. The cooling oil flows into the opening 256, along the annulus 254, and out of the opening 262. Then, the cooling oil is collected in the sump 128a. It is appreciated that a similar cross-sectional view is shown regarding the annulus 258 around the end turn 96c.

FIG. 5D shows an enlarged cross-sectional view of FIG. 5A. FIG. 5E shows an enlarged cross-sectional view in FIG. 5A being transactionally rotated 45 degrees. The cooling oil in the annulus 128 is sealed between the cooling distribution end cap 127 and the alternator/starter frame enclosure casting 126. Accordingly, no cooling oil in the annulus 128 leaks into the alternator/starter 86. Further, the annulus 254 and 258 are sealed by the cooling distribution end cap 127 and the windings are impregnated with a high strength epoxy resin, which prevents oil from leaking into the alternator/starter 86. Thus, there is no oil contamination introduced into the interior of the alternator/starter 86.

Figure 5F:
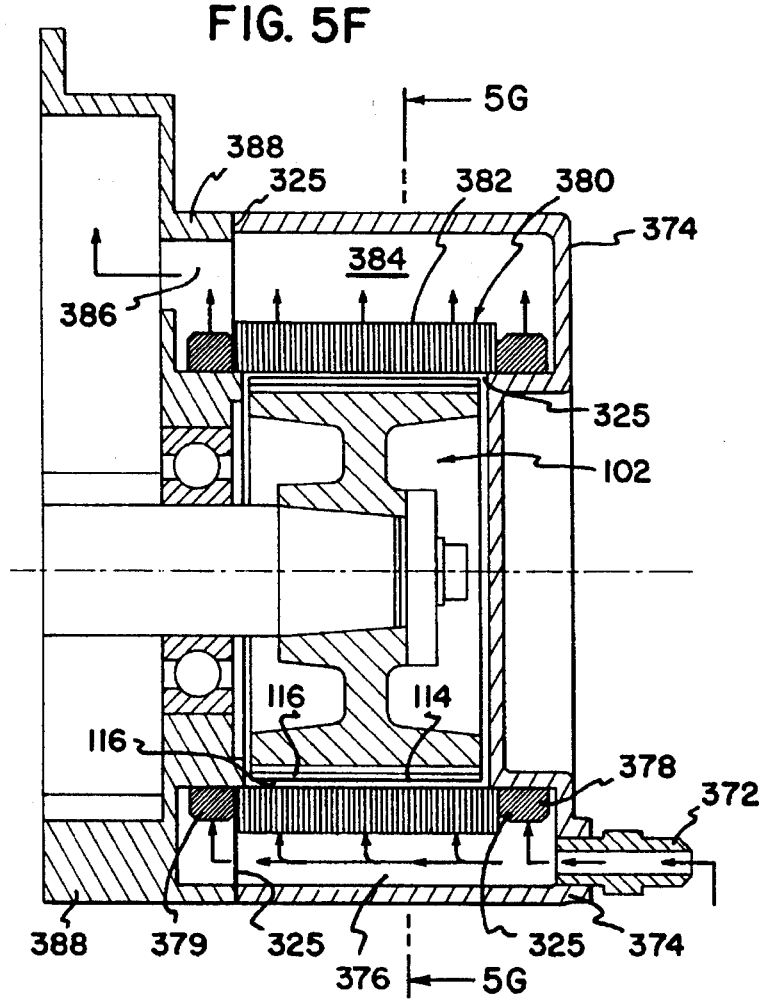
FIG. 5F is a cross-sectional view of a second embodiment of the rotor of the alternator/starter positioned on the end of the balance shaft.

Alternatively, another embodiment of the alternator/starter 86 is shown in FIG. 5F, which is similar to the preferred embodiment shown in FIG. 5A. The design of this alternator/starter 86 cooling system is the reverse of that described in FIG. 5A so that an oil inlet 372 is located at the bottom of the alternator/starter frame enclosure casting 374. One single annulus 376 is disposed around end turns 378, 379 and also disposed between the back of stator stack 380 and the alternator/starter frame enclosure casting 374. The cooling oil flows into the annulus 376 around the end turns 378, 379 on each side of the stator 382 and around the back of the stator stack 380, and then the pressurized cooling oil rises into a collecting sump 384. The cooling oil then flows out of an outlet 386. This reversed cooling oil configuration in the second embodiment simplifies the design of the alternator/starter 86.

In the second embodiment, the annulus 376 is also sealed from the interior of the alternator/starter 86 by a plurality of gaskets 325, which are disposed between the alternator/starter frame enclosure casting 374, the engine gear case cover 388, and the stator stack 380. Further, the windings at the end turns 378,379 are impregnated with a high strength epoxy resin which prevents oil from leaking into the windings or into the alternator/starter 86. Thus, no cooling oil leaks into the inside of the alternator/starter 86.

Figure 5G:
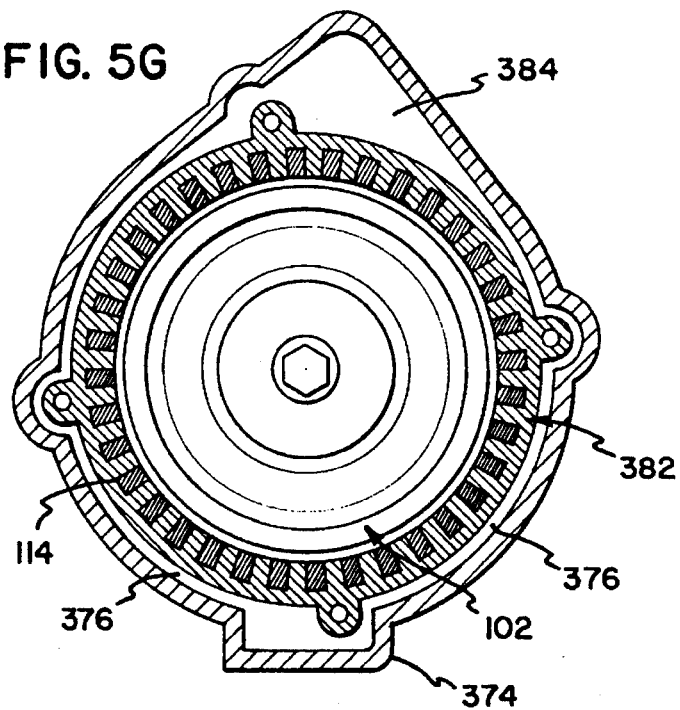
FIG. 5G is a cross-sectional view of a second embodiment along the line 5G—5G in FIG. 5F.

FIG. 5G shows a cross-sectional view of the annulus 376. The annulus 376 is also sized to ensure that the cooling oil contacts the back of the stator stack 380 so as to effectively transfer the heat from the stator stack 380.

Furthermore, oil cooling allows the alternator/starter 86 to be completely sealed and eliminates concern about highly variable contaminants normally carried in the cooling air for an air cooled alternator/starter. Further, the oil flow passing through the annulus is sealed to prevent high viscous drag from the oil entering the air gap.

Illustrated in FIGS. 7A,7B is a schematic of a thermal management system 201.

In the embodiment shown in FIG. 7A, the alternator/starter 86 is oil cooled. The engine 84 is primarily cooled by cooling water, and to an extent, the engine is cooled by the lubricating oil as well. The cooling oil for the alternator/starter 86 is usually required to be much cooler than the lubricating oil for the engine 84, so that an auxiliary heat exchanger 390 is used to further cool the cooling oil before it flows into the alternator/starter 86.

In the embodiment shown in FIG. 7A, the cooling oil 270 flows from the auxiliary heat exchanger 390, cools the alternator/starter 86, and collects in a sump 211. Another oil flow 272, without passing through the auxiliary heat exchanger 390, is pressurized or sprayed into various positions 274 in the engine 84. The oil from the engine 84 also drops into the collecting sump 211. The collected oil is scavenged into a suction tube 276 by a pump 278 and is transferred to an external heat exchanger 280 and a heat exchange bypass 282, which allows the oil to bypass the heat exchanger 280 under cold conditions. Then, the cooling oil is circulated and split into two paths, one path for the engine lubrication and cooling, and another path for the alternator/starter 86 passing through the auxiliary heat exchanger 390.

In the embodiment shown in FIG. 7A, a wet sump 211 is used. It will be appreciated that a dry sump might be used as shown in FIG. 7B. By using the dry sump 500, the size of the dry sump 500 can be dramatically reduced because the power of the pump 278 is large enough to scavenge the oil immediately so that almost no oil will be retained in the collecting sump 211. Because of the reduced size of the collecting sump 211, the height of the engine 84 can be dramatically reduced. Since the oil is transferred rapidly in the dry sump design, an oil reservoir 284 is placed into the circulated path between the heat exchanger 280 and the split of the oil path. A pump 286 pressurizes the cooling oil from the oil reservoir 284. The cooling oil is then split into two paths, one path for the engine 84, and another path for the alternator/starter 86 passing through the auxiliary heat exchange 390. The pressure of the cooled oil is regulated by an oil regulating valve 288.

In FIG. 7C, there is shown a second embodiment of the oil flow path 210 according to FIG. 5F, the oil flow 270 flows into the bottom of the alternator/starter enclosure casting 374 and flows out at the top of the enclosure casting 374.

In operation, the external cooling circuit flow will be bypassed under conditions of high flow restriction (cold starts) and modulated when cooling requirements are low. A preferred embodiment will have a provision for up to two piston cooling jets per cylinder. The alternator/starter oil circuit is in parallel with the engine cooling and lubricating oil circuit. Oil cooled to the desired temperature by the oil to air heat exchanger 280 and the auxiliary oil to air heat exchanger 390, enters the alternator/starter enclosure casting 126 (374 in the second embodiment) and is directed over the stator winding end turns 96b,96c (378,379 in the second embodiment) and the back of the stator stack 96a (380 in the second embodiment) by the annulus 254,258,128, respectively. The oil then exits at the collecting sump 128a (384 in the second embodiment) of the alternator/starter assembly at a temperature of approximately 95 degrees Centigrade. The oil flow mass is maintained at roughly 3.6 Kg/min(4.3 Liters/min volumetric flow) and is required to maintain safe alternator/starter operating temperatures under a maximum alternator/starter loss of approximately 2.3 kW (about 93 percent efficiency) at rated speed and power.

Also illustrated in FIGS. 7A,7B is a water cooling system 203, which includes a gear driven water pump 205. The water enters a cylinder head 207 and exits from an engine crankcase 209. This flow configuration allows a higher compression ratio with its attendant engine efficiency increase, due to the lower cylinder head temperature.

Noise, Vibration, and Harshness (NVH) Control Systems

In order to minimize the noise created by the hybrid electric vehicle, the following four steps need to be taken:

1) reducing the overall noise level;

2) improving sound quality by shaping the noise frequency spectrum and eliminating individual offensive frequencies;

3) lowering APU noise levels while the vehicle is moving slowly or stopped with engine speed management; and 4) minimizing the vehicle re-amplification of noise by treating the APU and vehicle as a system.

Figure 6A:
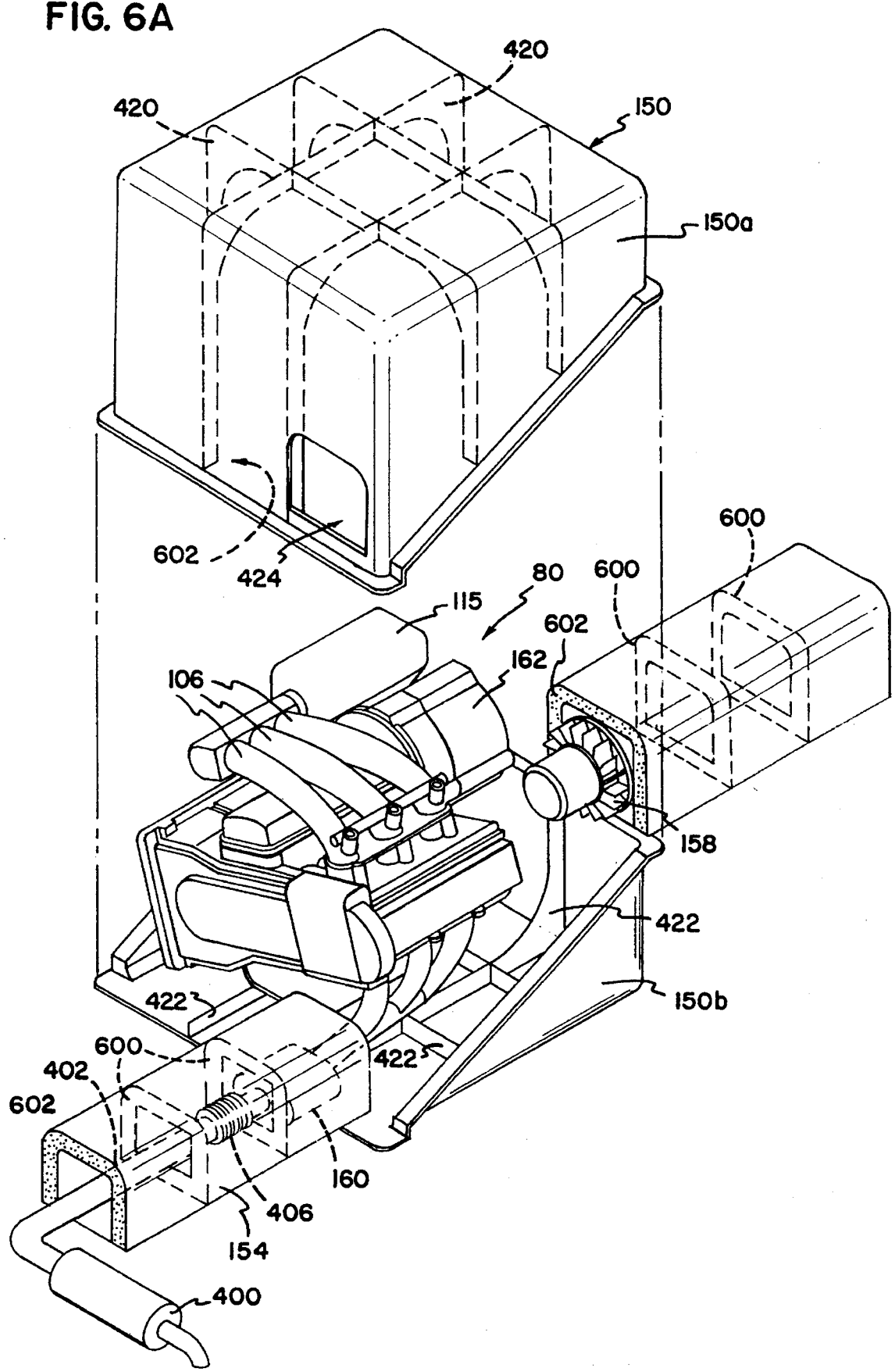
FIG. 6A is a perspective view of the auxiliary power unit disposed in an enclosure which is opened for purposes of illustration, a ventilation system being connected to the enclosure for ventilating the auxiliary power unit.
Figure 6B:
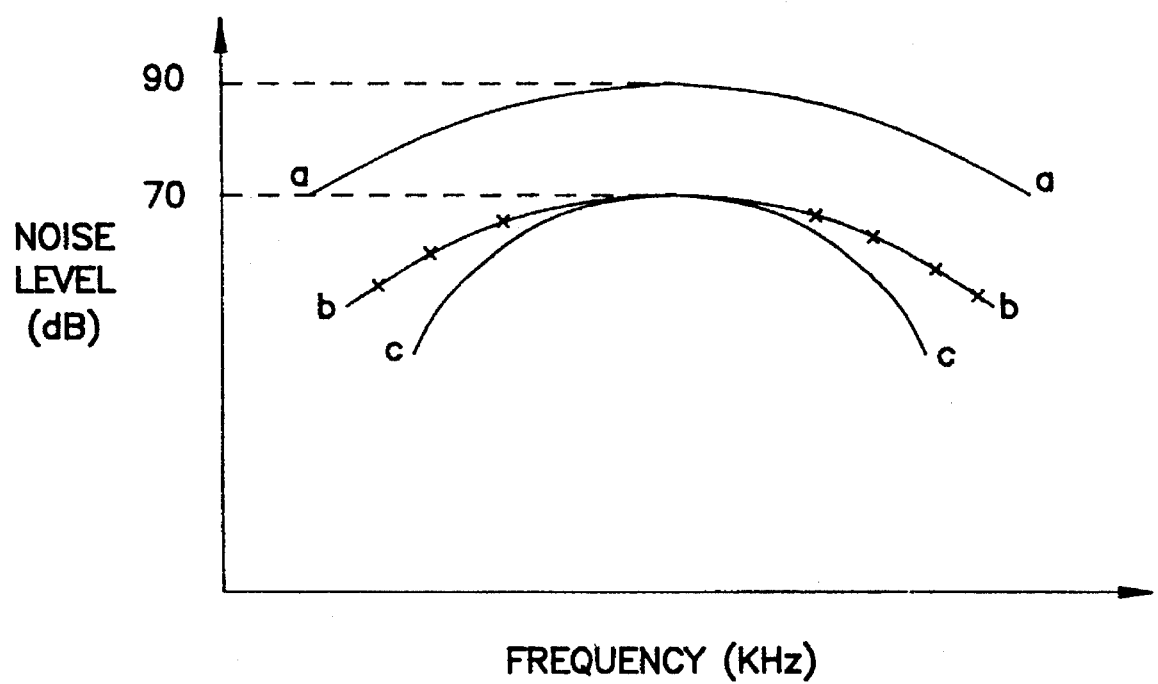
FIG. 6B is a graph of APU engine noise level vs. Frequency.

For illustration and clear explanation purposes, FIG. 6B shows a graph of noise level vs. frequency. The top line (a) illustrates APU engine noise without a noise control system. A line (b) illustrates approximately 20–22 dB of noise level reduction due to the noise level control system. The noise level control system includes a muffler 400, an induction silencer 115, an APU enclosure 150 lined with acoustical material 603, a ventilation inlet duct 152 lined with acoustical material 602, and ventilation outlet duct 154 lined with acoustical material 602 (see FIG. 6A). Thus, the noise level is dramatically reduced by the noise level control system.

FIG. 6B also shows a third line (c) having a dramatic noise level reduction at low and high frequencies. This shaping of the sound frequency spectrum greatly improves sound quality even though the amplitude of the noise level is almost the same as the second line which it crosses. To improve the sound quality at higher frequencies, exhaust system shell noise sources are attenuated, which include an exhaust gas tube 402, an exhaust gas manifold 404, the muffler 400, a catalyst converter 160, and a flex section 406. In addition, the stiffness of various engine surfaces is increased to help improve the sound quality at the higher frequencies. Further, the acoustical material 600 in the housing of ventilation inlet duct 152 and the ventilation outlet duct 154 significantly attenuates the higher frequency noise to help improve the sound quality as well. Also acoustical material inside the enclosure 150 lowers noise levels. To improve the sound quality at lower frequencies, the induction silencer 115 is used. Also, stiffening of the noise enclosure to raise its natural frequency lowers low frequency noise levels.

Figure 6C:
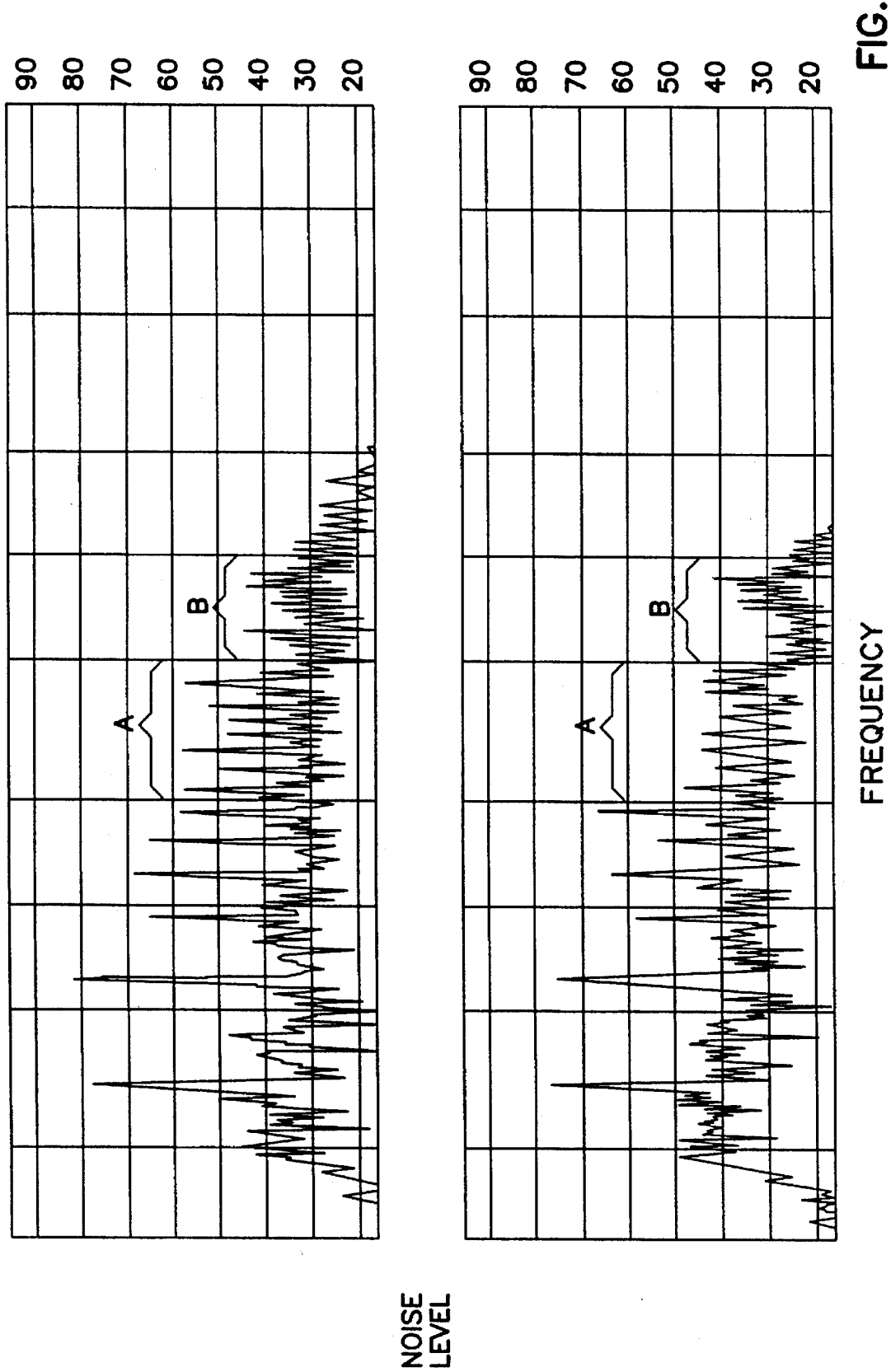
FIG. 6C is a graph of noise levels in a frequency domain.

Further, noise levels at some individually offensive frequencies are reduced with the APU noise control system. FIG. 6C shows noise levels plotted in a frequency domain. Comparing the top and bottom graphs, the noise levels at frequency area A in the bottom graph are much less than the corresponding frequency area A in the top graph. The induction silencer lowers the noise levels in frequency area A.

The noise levels at frequency area B in the bottom graph are much less than the corresponding frequency area B in the top graph. These noise level reductions at the frequency area are due to the contribution of the exhaust shell noise sources including the exhaust gas tube 402, the exhaust gas manifold 404, the muffler 400, the catalyst converter 160, and the flex section 406 shown in FIG. 6A. The elimination of other individual offensive noises such as parts in resonance will also be needed to optimize sound quality.

Figure 6D:
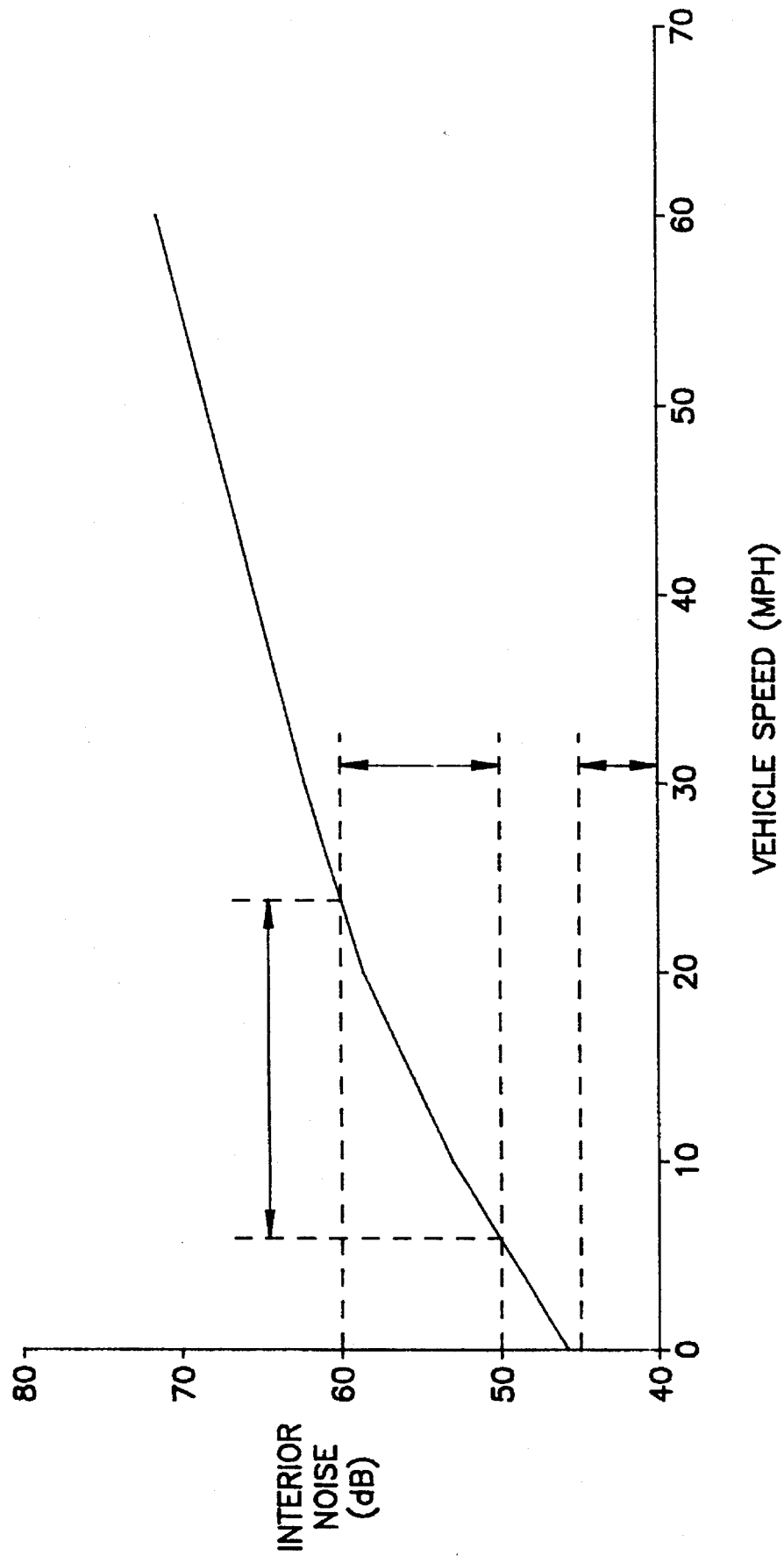
FIG. 6D is a graph of interior noise level (dB) vs. vehicle speed (mph) of a typical vehicle.

To clearly explain how to meet vehicle interior noise goals, a graph of interior noise level (dB) vs. vehicle speed (mph) of a typical vehicle, such as '93 Caravan, is shown in FIG. 6D. The vehicle interior noise decreases when the vehicle speed decreases. However, at that time, with the APU engine at 5500 RPM the noise level might be significant even though it is lower than the vehicle interior noise when the vehicle is running at a high speed. Thus, reducing the APU engine noise even further becomes a goal of reducing the entire vehicle interior noise.

With the APU engine running at 5500 RPM, the interior vehicle noise level is in a range of 50–60 dBA, and when the APU engine running speed is 2800 RPM, the interior vehicle noise level is in a range of 40–45 dBA. In this embodiment, the APU speed range for proper voltage and current regulation is from 2800 RPM up to 5500 RPM. Therefore, the APU generated interior noise levels are in a range between 40–60 dBA. It can be seen from FIG. 6D that the APU engine noise is not audible until the vehicle speed is reduced to approximately 15–25 mph. In order to lower this APU engine noise, the APU engine running speed is changed to 2800 RPM whereby the noise level (40–45 dB) is lower than the vehicle interior noise. As a result, through adjusting the APU engine speed, the vehicle interior noise level is not influenced by the APU engine noise.

Figure 6E:
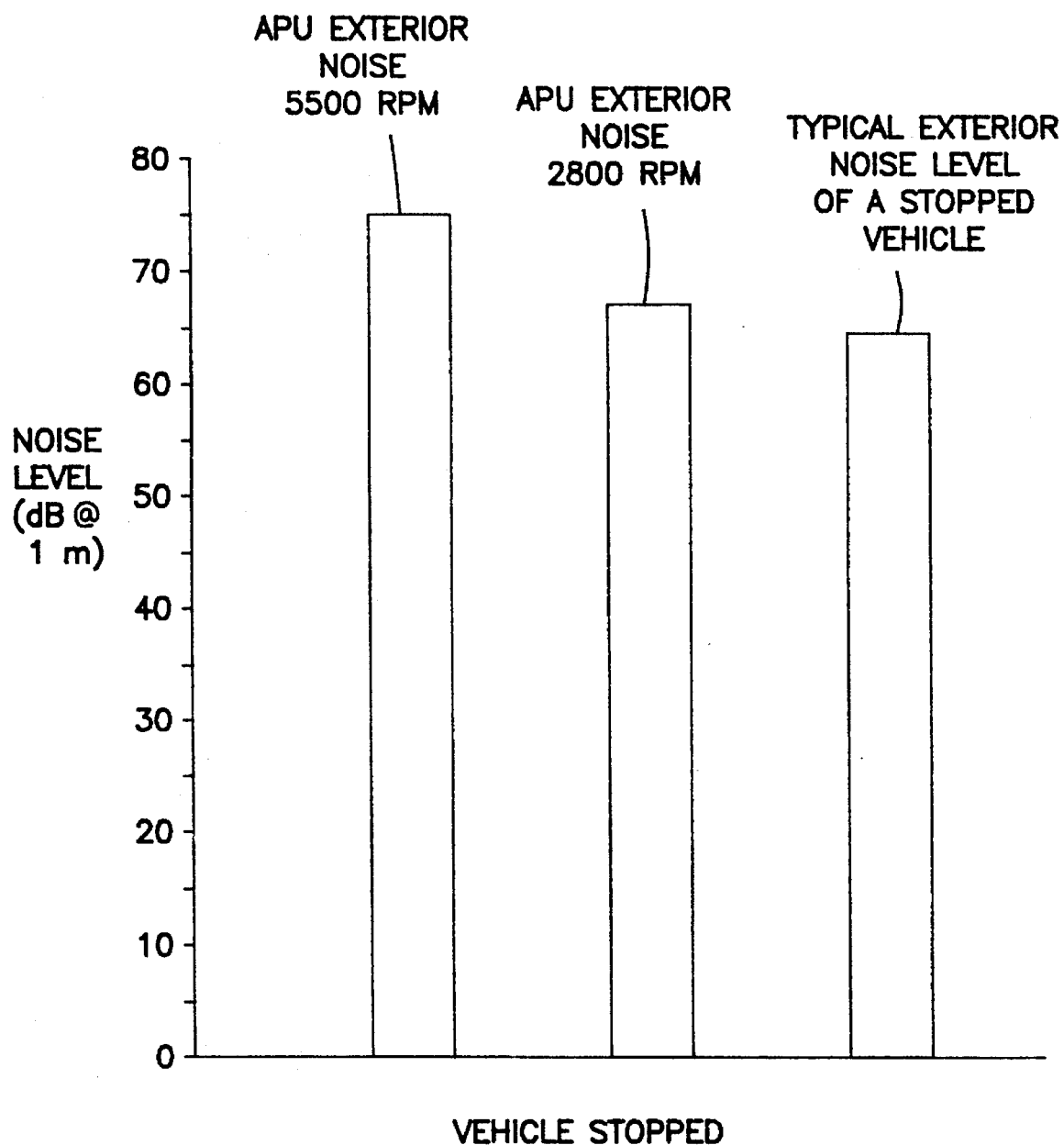
FIG. 6E is a graph of exterior noise level (dB) when the vehicle is stopped in a typical vehicle, such as '93 Caravan.

With the hybrid electric vehicle stopped in a crosswalk situation, the noise level and tone from APU running at higher speeds may cause some people to be alarmed. In a crosswalk situation, people expect cars to have idling engines with appropriate noise levels and tone. For clear explanation purposes, a graph of exterior noise level (dB) of a typical vehicle, such as '93 Caravan, is shown in FIG. 6E.

To control exterior noise level, sound quality and tone, the APU's speed and load may be changed or the APU stopped. Specifically, the unit may operate with or without load between 2800 RPM and 5500 RPM, without load from 2800 RPM to idle speed or be completely stopped for exterior sound control reasons. The loaded speed range is determined by voltage and current control capability. The quoted speed range is expected typical performance. Typically, when the APU engine running speed is 5500 RPM, the exterior noise level is in a range of 70–75 dB, and when the APU engine running speed is 2800 RPM, the exterior noise level is in a range of 60–65 dB, which are both higher than the normal vehicle exterior noise level. In one embodiment, the APU engine is shut off so that no audible noise is created by the APU engine.

The last step is to minimize the vehicle noise level as a system. After the APU 80 is installed into the hybrid electric vehicle, the APU may excite mechanical and acoustic resonances in the vehicle itself. These resonances can re-amplify the previously attenuated noise or vibration to a problem level. In addition, sound energy can be converted by a mechanical resonance to vibration. Also, vibration by a resonance can be converted to sound. With knowledge of the vehicle resonances, the APU 80 can be designed to minimize the sound or vibration input at these resonant frequencies. The method to do this, in one embodiment, is the same strategy of optimizing the spectrum on an individual frequency basis as discussed before.

The vehicle vibration generally comes from the following four sources:

1) the APU engine vibrations;

2) imbalanced gears, shafts, alternator, or other system parts generating vibrations;

3) vibration of the APU enclosure 150 from acoustic and mechanical excitation; and 4) re-amplification generated by the resonance of the vehicle itself or the attachment structure.

Figure 10:
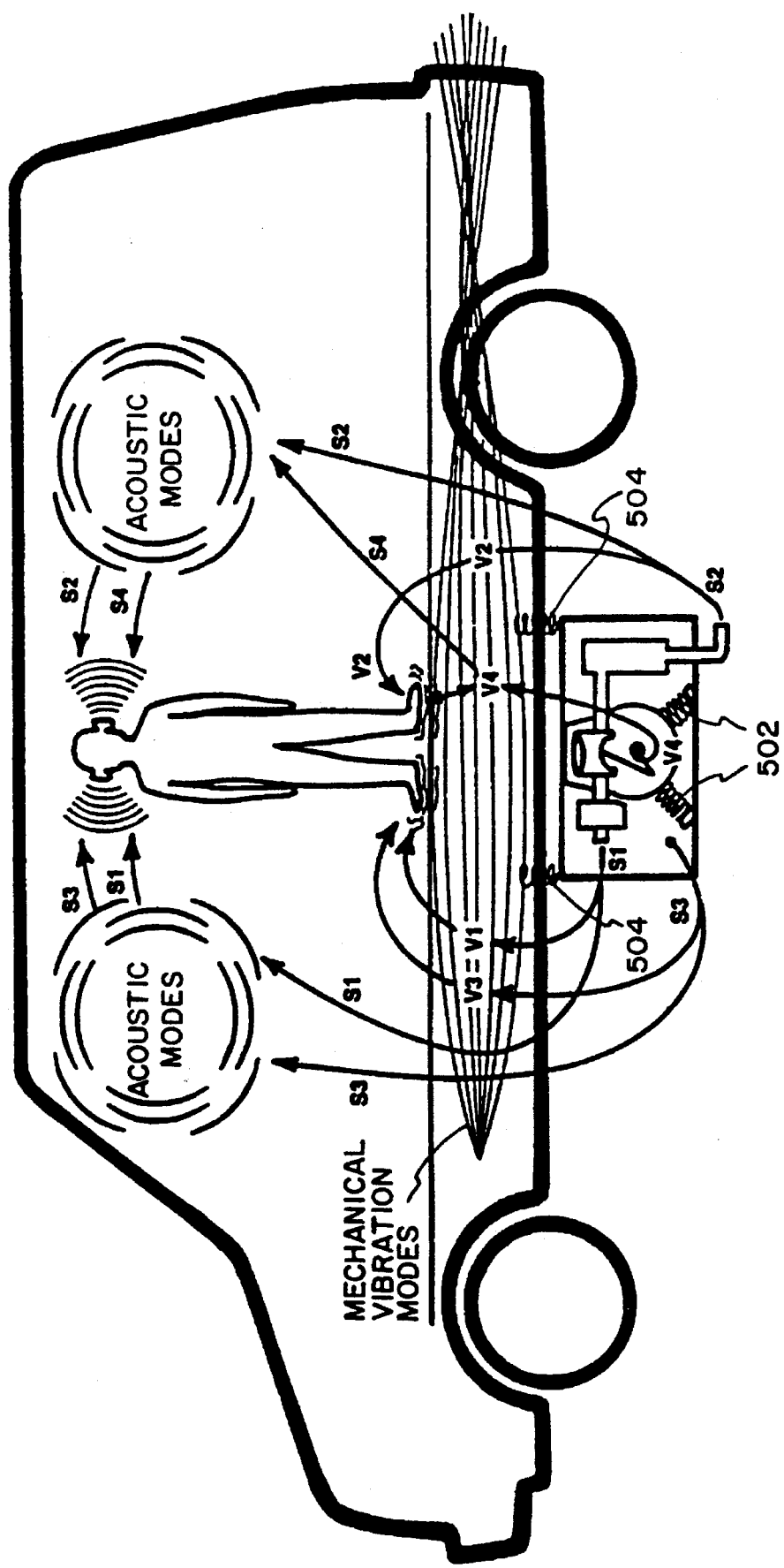
FIG. 10 is a noise, vibration, and harshness control system.

FIG. 10 shows these four vibration sources. The letter "s" stands for noise sources or noise sources transferred from various vibration sources. The letter "v" stands for vibration sources or vibration sources transferred from various noise sources. S1 is the noise from the APU engine intake. S1 can also be transferred to V1 through resonance of various mechanical parts in the vehicle body. S2 is the noise from the APU engine exhaust system. S2 can also be transferred to V2 through resonance of various mechanical parts in the vehicle body. S3 is noise from the other APU engine parts, and S3 can also be transferred to V3 through resonance of various mechanical parts in the vehicle body. V4 is vibration from the engine itself, and V4 can be also transferred to sound S4 through resonance of various mechanical parts in the vehicle body.

Figure 1:
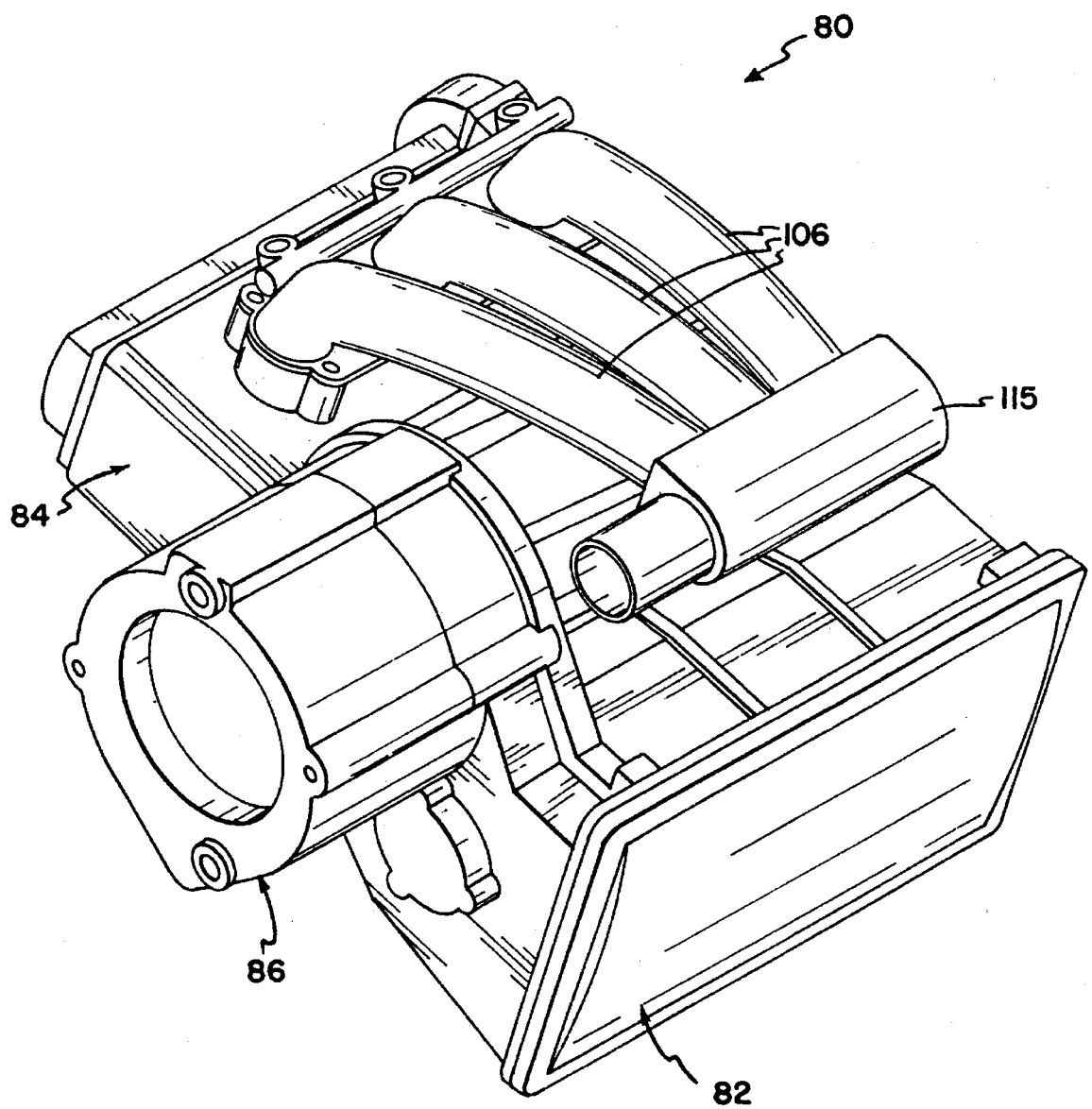
FIG. 1 is a perspective view of an embodiment of an auxiliary power unit in accordance with the principles of the present invention.
Figure 2:
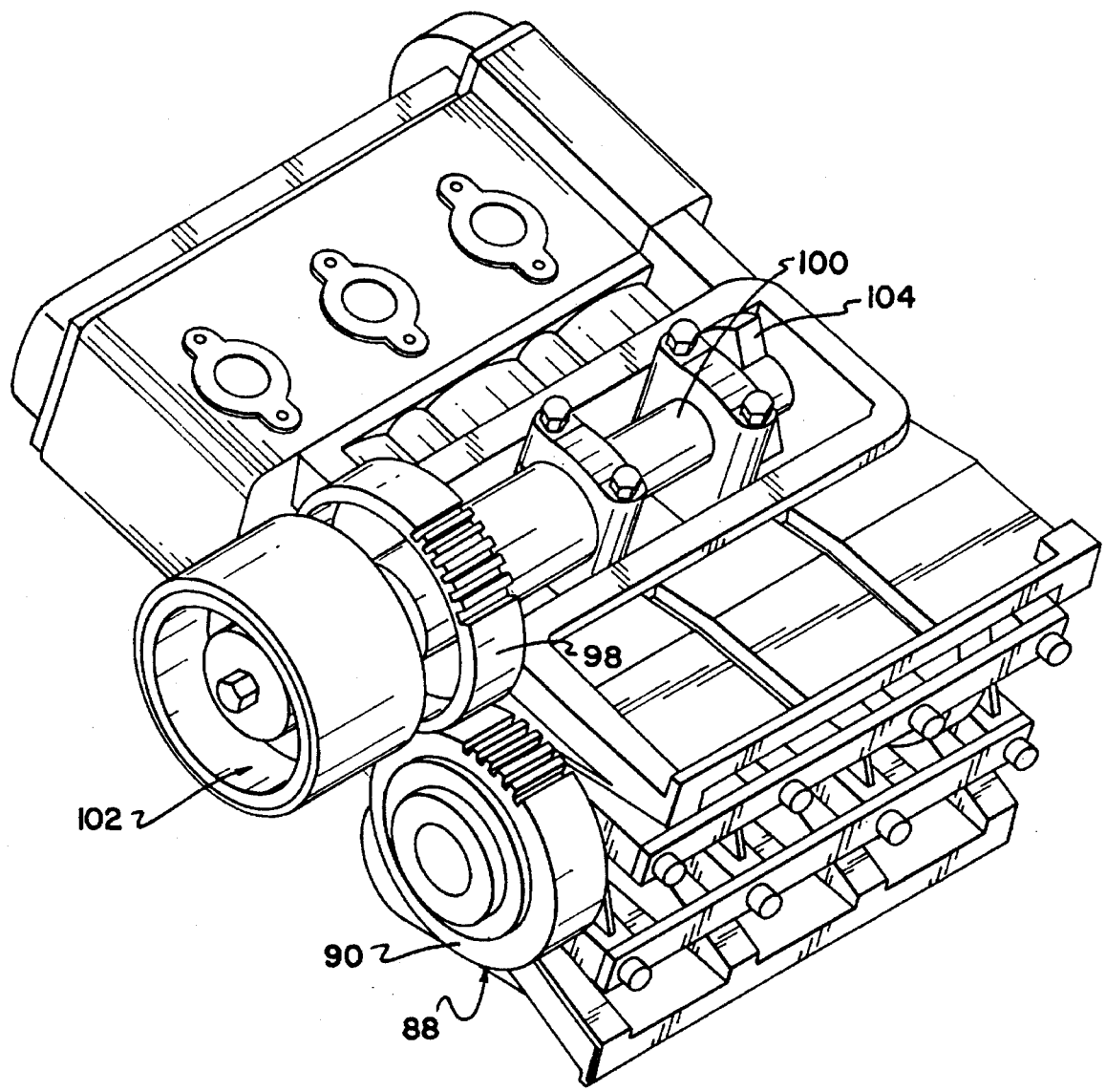
FIG. 2 is a view similar to FIG. 1 with portions of the auxiliary power unit housing removed to illustrate internal parts.
Figure 3:
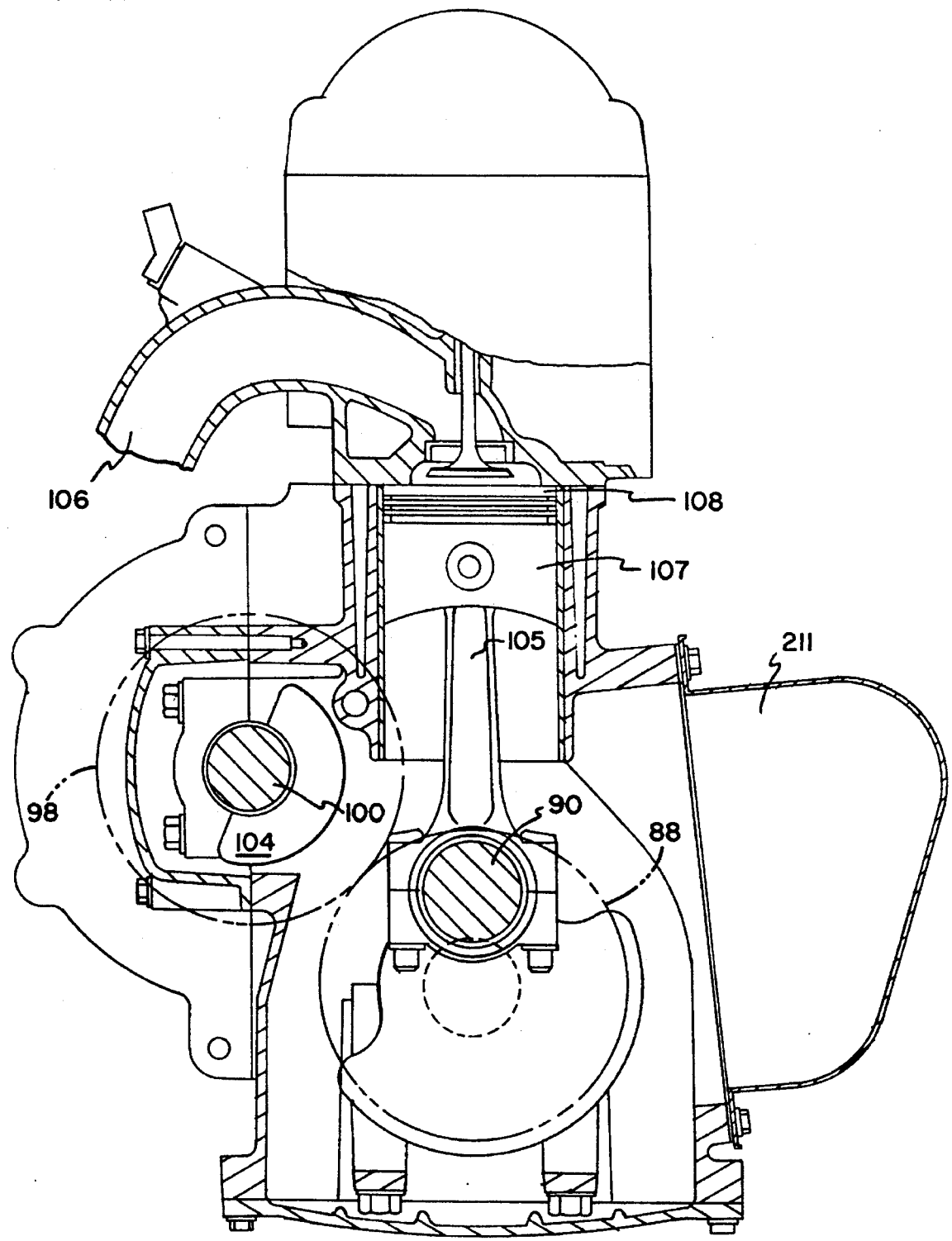
FIG. 3 is a transverse cross-sectional view of the auxiliary power unit.

To reduce the APU engine vibrations, there is shown in FIG. 2 a net zero angular momentum system. In FIG. 2, the auxiliary power unit 80 has portions of the housing 82 removed. A first gear 88 is driven by a crankshaft 90 of the combustion engine 84. A counter rotating engine speed balance shaft 100 is disposed alongside the crankshaft 90. A second gear 98 is mounted on the balance shaft 100 for engagement with the first gear 88 on the crankshaft. The first gear 88 causes the balance shaft 100 and the crankshaft 90 to rotate in opposite direction upon rotation of the crankshaft 90. The rotor 102 of the alternator/starter 86 is mounted on the end of the balance shaft 100 for rotation therewith. In the preferred embodiment, the alternator/starter 86 functions to charge the electric vehicle's batteries and also as a starter for starting the engine 84. Two balance weights 104 are selectively sized and positioned on the counter rotating balance shaft 100 so as to effectively cancel primary rotating couple of the auxiliary power unit 80 due to reciprocating motion of the pistons 107 and rods 105 shown in FIG. 3. Additionally, a net angular momentum of all rotation components in the auxiliary power unit 80 is zero, resulting in a zero vibratory roll torque acting on the auxiliary power unit 80. These vibratory roll torques are typically caused by such things as piston thrust and bearing reaction forces, alternator/starter torque pulses, starter torque pulses, etc. Therefore, the auxiliary power unit 80 exhibits substantially no vibratory roll motion. The crankshaft and balance shaft create equal inertia counter rotating systems that cancel all vibratory roll torque impulses including those encountered during startup, shutdown, and transient operating condition. Thus, the vibration V4 and noise S4 created by the APU engine are minimized.

To minimize the vibrations from the imbalanced gears, shafts, alternator, or other system parts, the engine exhaust system and engine mounting structure are specifically designed. In one embodiment, a set of rubber vibration isolators 502 are, used in the engine mounting structure. It is appreciated that any other type of vibration absorbing members, such as springs, can be used. A detailed discussion of the structure of the engine exhaust system flex section will be provided later. The "six" rigid body mode natural frequencies of this mounting system are designed to be in the 8–10 Hz frequency range for high levels of vibration isolation.

To minimize the vibrations transmitted from the APU enclosure 150 to the vehicle itself, a set of rubber vibration isolators 504 are used in the APU mounting structure. It is appreciated that any other type of vibration absorbing member, such as springs, can be used. The mass of noise enclosure 150 between the two vibration isolation systems enables the two vibration isolation systems to simultaneously isolate vibration.

The mass of the enclosure 150 plus attached parts typically must be about 10% of the engine/alternator mass for good "dual" isolation system performance.

To minimize the vibration re-amplification generated by the resonance of vehicle or mounting structure, the APU enclosure 150 and other mounting parts are specifically designed. A detailed discussion will be provided later.

Harshness is usually characterized by people's reaction to noise and vibration from various sources. In this case, it is the people's reaction to noise and vibration generated by the hybrid electric vehicle APU. The harshness is well controlled by dramatically reducing the noise and vibration as discussed before.

In one embodiment shown in FIG. 6A, the integrated auxiliary power unit 80 is installed in an enclosure 150 and is connected with other ancillary systems so as to form an auxiliary power system having noise, vibration, and harshness control. The stiffness of the enclosure 150 is usually designed to meet the requirement of the noise and vibration control with the enclosure specifically designed for specific natural frequencies. A plurality of ribs are molded to strengthen the stiffness of a top cover 150*a* of the enclosure 150. Two couples of cross ribs 420 are disposed at inside walls parallel to the edges of the enclosure 150. In addition, a plurality of ribs 422 are disposed at the inside bottom of a bottom container 150*b* of the enclosure 150. The ducts may also have the same type of stiffening ribs 600.

A high performance vibration isolation system also includes the induction silencer 115 which reduces the low frequency acoustic excitation of the enclosure 150. The enclosure 150 is in turn isolated from the vehicle with a second isolation system so that sound induced excitation of the enclosure is not transmitted into the vehicle body. The flex section may be placed at the vibration isolation system roll center to further reduce the vibration transmitted through the exhaust system.

The flex section 406 in the exhaust system after the catalytic converter 160 will isolate exhaust system vibration from the vehicle body.

In one embodiment, the enclosure 150 might be formed by existing engine compartment surfaces which have been suitably acoustically treated. In yet other embodiment, the enclosure 150 might be open to the pavement below.

The exhaust noise is preferably attenuated by about 50 to 60 dB with a muffler. Induction noise is attenuated by about 10 to 22 dB with the induction silencer 115. The ducts 152 and 154 lined with the acoustical material 600 attached to the ventilation openings 424 of the enclosure 150 attenuates the noise to the same level as the enclosure 150 which has 22 dB of attenuation. The ducts may include a 900 or greater bend for further noise reduction by blocking line of sight noise.

Proper execution of intake, exhaust and enclosure noise attenuation systems will preferably result in uninstalled auxiliary power unit 80 having noise levels of approximately 70–76 dBA @1 meter for 2800 RPM and 83–88 dBA @1 meter for 5500 RPM.

Further in FIG. 6A, an enclosure ventilation fan 158 is located in the enclosure 150 near the end of ventilation inlet duct 152 for thermal management. Thus, outside ambient cooling air is blown into the auxiliary power system 80 so as to reduce the high temperature therein. Warm air is vented out the exhausted gases outlet duct 154.

Emissions/Fuel Economy Systems

The auxiliary power unit 80 will meet 1997 ULEV emission standards. The emission control system incorporates both inlet port induced air motion and compression induced turbulence for fast and complete combustion. The exhaust will be passed through a close coupled supplementary heated if necessary, 3-way catalytic converter 160 to maximize emission conversion efficiency. Supplementary air to the converter 160 will be provided if required. A closed loop control of the sequential port fuel injection system will be used for optimum stoichiometric air-fuel ratio control. It is appreciated that as "lean burn" 3-way catalytic converter technology is perfected, air/fuel ratios considerably leaner than stoichiometric (14.7:1) will be incorporated to further reduce fuel consumption. Electronically controlled exhaust gas recirculation will be used to minimize oxides of nitrogen-NOx (x=1, 2, 3, 4, etc.) production in the combustion process.

Figure 8:
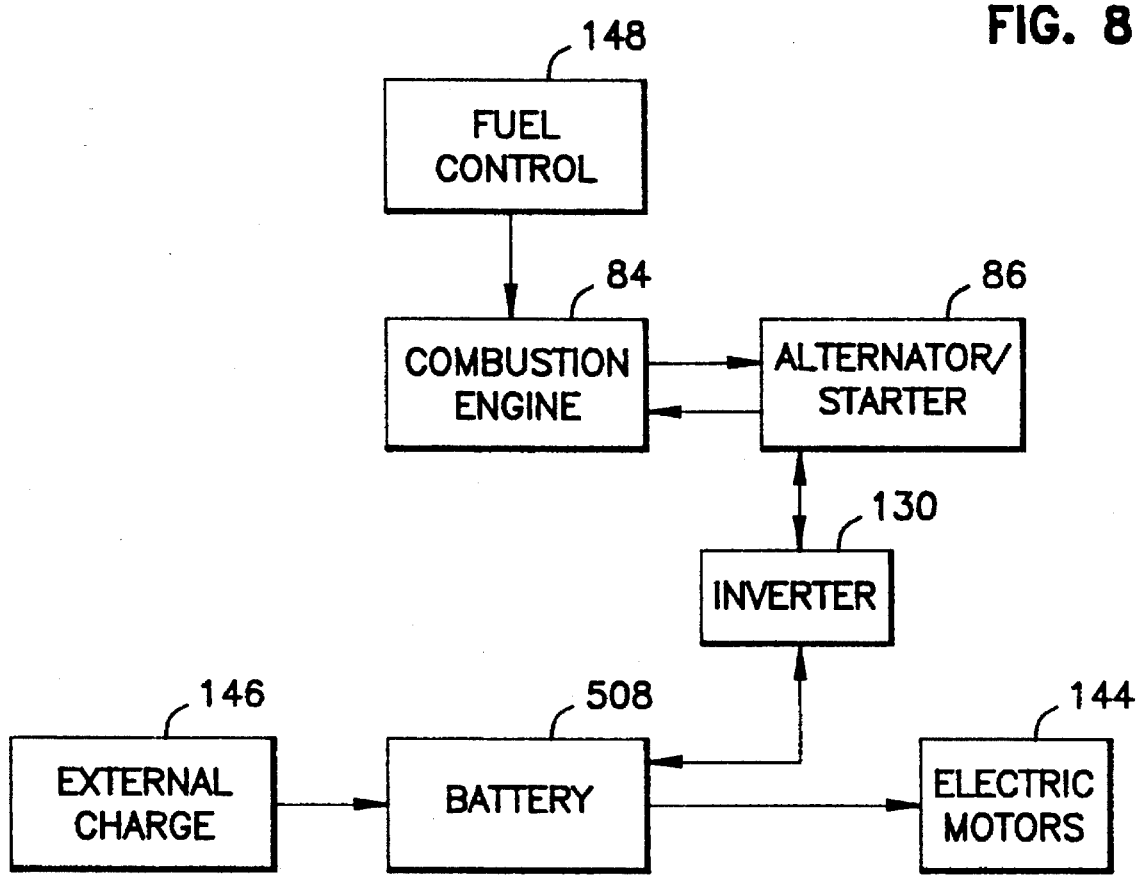
FIG. 8 is a block diagram of a hybrid electric vehicle system in accordance with the principles of the present invention.

FIG. 8 shows a block diagram of a hybrid electric vehicle which has batteries 508 providing electrical power to the vehicle electric traction motors 144. The batteries 508 can be recharged either by an external energy source 146, such as the electric utility grid, or by the alternator/starter 86 through an inverter 30. The alternator/starter 86 is driven by the combustion engine 84 which uses combustible fuel such as gasoline, diesel, CNG (compressed natural gas), LPG (liquid petroleum gas), M/E 85 (methanol/ethanol 85), etc. The auxiliary combustion engine 84 is started by the alternator/starter 86 when a vehicle master control unit 172 (shown in FIG. 11) senses that the batteries 142 need charging.

It is anticipated that the operating modes of an HEV will entail, operation at various power levels, speeds and periodic stop/start cycles. By utilizing cylinder shut down and RPM (speed) control, fuel economy, emissions, and NVH (noise vibration harshness) can be minimized at various real world driving conditions.

To minimize emissions during start cycles, the catalytic converter pre-heating can be employed. To minimize fuel conditions at part load demands, cylinder shut down and RPM reduction can be employed. This can be accomplished without any increase in NVH by the use of zero net angular momentum balancing as mentioned before.

APU Battery Charging System

Figure 12:
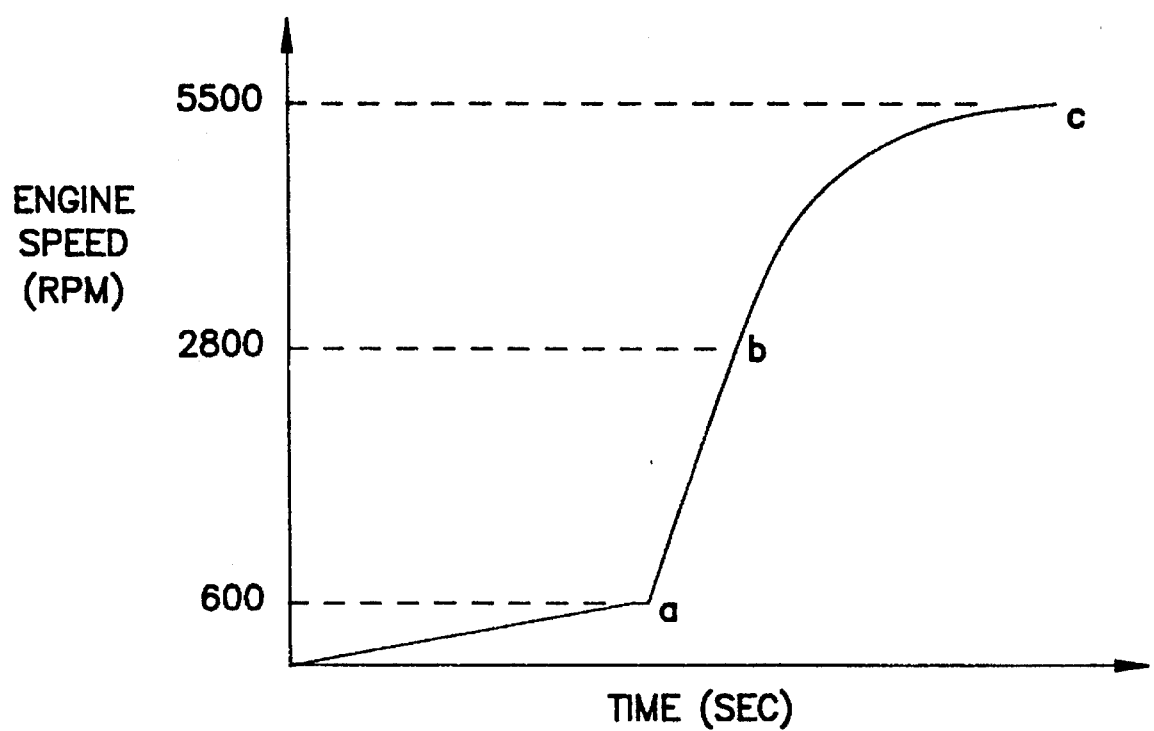
FIG. 12 is a graph of APU engine speeds vs. time in a battery charging system.

The APU 80 includes the APU master control unit 518 which charges the vehicle battery 508 when the vehicle needs more power. The APU 80 includes the inverter 130 electrically connected to the alternator/starter 86. The APU master control unit provides a maximum continuous thirty-five kilowatts power output controlling output current from the alternator/starter 86 in a battery charging power loop 512. The APU master control unit 518 is also designed to utilize battery voltage provided by the electric vehicle's batteries to provide an estimated sixty foot pounds APU engine cranking torque to the crankshaft 90 required to start the combustion engine 84 in an engine start speed loop 510. Once the APU engine 84 is started and runs up to about 600 RPM, the APU master control unit 518 disconnects the engine start speed loop 510, and connects to the battery charging power loop 512 to charge the batteries by using the electricity generated from the alternator/starter 86. FIG. 12 shows a plot of APU engine speeds at different time (a,b,c) during the cranking cycle. The explanation is as follows:

1) To increase engine speed from 0 to about 600 RPM (a), the inverter current loop reference is obtained from the start speed loop 510 to use the battery power to start and run the APU engine 84 to a minimum running speed, such as 600 RPM in the embodiment. It is appreciated that the minimum running speed can be changed according to different APU engine designs or starting criterion.

2) When the APU engine speed is 600 RPM, there is usually a short period of engine adjusting time (a–b). It is appreciated that this period of engine adjusting time will vary according to different APU engine designs.

3) When the APU engine speed further increases, the inverter current loop is disconnected from the start speed loop 510, and then the system is connected to the battery charging power loop 512. At this time, the APU engine 84 and the alternator/starter 86 creates electricity to charge the same batteries which are used to start and run the APU engine 84 in (1).

4) In one embodiment, the maximum APU engine speed is about 5500 RPM (c). The minimum normal APU engine running speed which meets the battery requirement is about 2800 RPM. It is appreciated that the maximum and minimum APU engine speeds can be adjusted according to different APU designs.

5) The APU master control unit 518 is also used to adjust the APU engine speed as required. For example, as discussed before, the APU engine speed needs to be reduced from 5500 RPM to 2800 RPM to prevent excessive interior and exterior vehicle noise at slow vehicle speed or while the vehicle is stopped.

Further, there is an initial APU engine crankshaft position detecting procedure before the inverter system starts the APU engine 84. The detailed description of this initial engine position detecting procedure will be discussed later.

Figure 9:
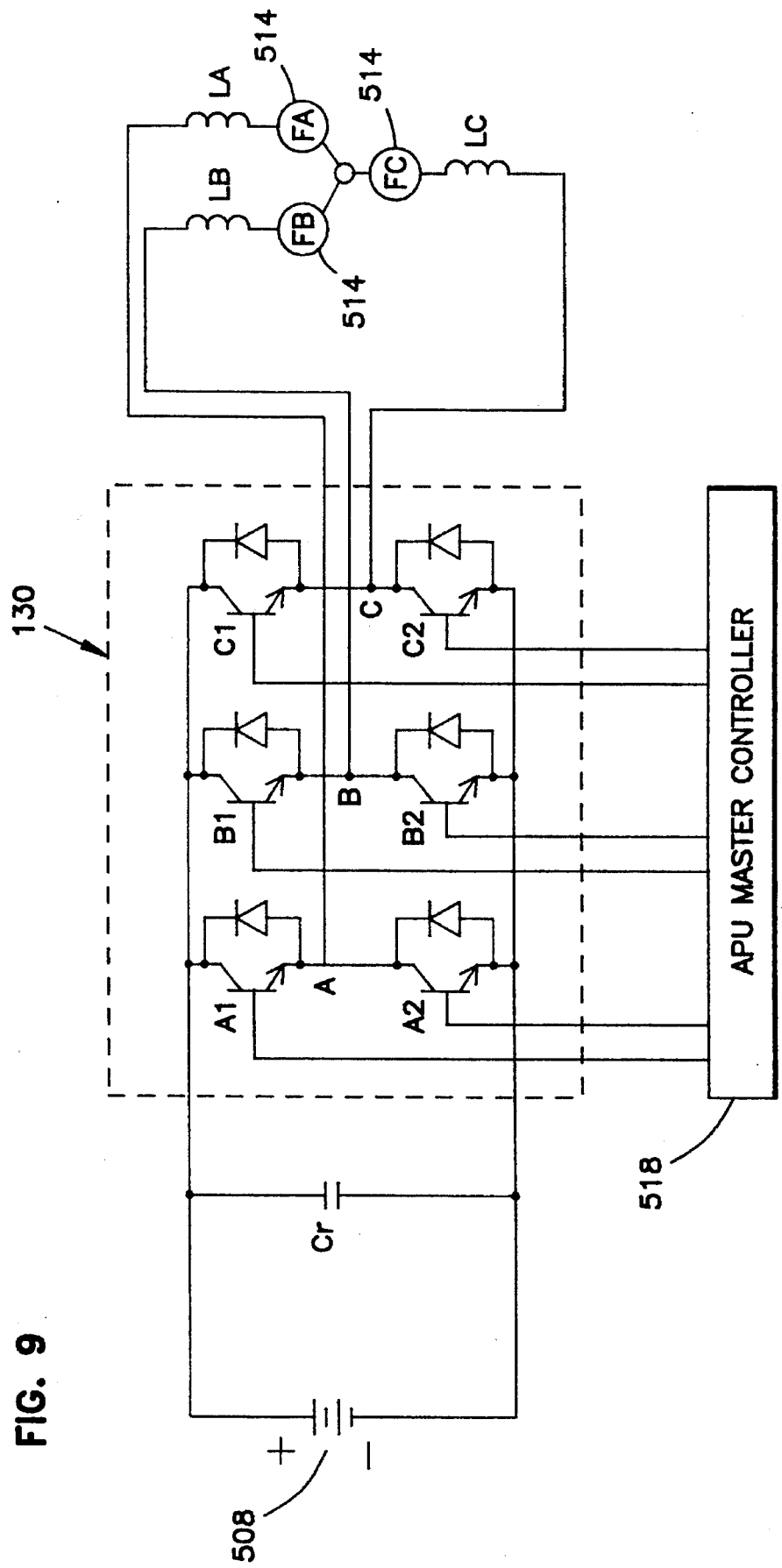
FIG. 9 is an electrical schematic diagram of an inverter for a battery charging system.

The inverter 130 of the APU master control unit 518 is electrically connected to the three alternator/starter phases so a three-phase current output is produced by the inverter 130 in the APU master control unit 518 using alternator/starter inductance as a current filter. FIG. 9 shows an electrical schematic graph of the inverter 130. There are shown three transistor legs parallel to each other. Each transistor leg has two transistors in series electrically connected to a common node, designated reference numbers A,B,C, respectively. For explanation purpose, the upper transistors are named A1,B1,C1, and the lower transistors are named A2,B2,C2, respectively. The common nodes A,B,C are electrically connected to alternator/starter back emf FA,FB,FC through inductors LA,LB,LC, respectively. In each transistor, the collector node is electrically connected to the emitter node through a one-way diode. The emitter node of each transistor is electrically connected to six isolated outputs of a drive amplifier device 516 of the APU master control unit 518. The drive amplifier device 516 has six isolated drive amplifiers each of which has an isolated voltage reference node. The logic output of each isolated drive amplifier provides an "on" or "off" logic signal to the gate node of each transistor. The voltage reference nodes are electrically connected to the emitter node of each transistor. The APU master control unit controls the gate node of each transistor so that each transistor series connected set has one transistor in an "on" status and the other transistor in an "off" status. The APU master control unit 518 also controls at least one upper transistor, A1,B1,C1, and one lower transistor, A2,B2,C2, in an "on" position. These transistor sets are further electrically parallel connected to the vehicle batteries. A filter capacitor CR is used across the inverter positive and negative rails to filter out current spikes and prevent the spikes from reaching the vehicle battery as shown in FIG. 9.

At the APU engine start time, the inverter 130 discharges the batteries and converts DC voltage of the batteries to a three-phase AC voltage at an output node 425. Thus, the alternator/starter 86 is used to apply the cranking torque to the APU engine crankshaft 90. Then, the fuel and ignition systems are energized to start the engine. The fundamental frequency of the inverter 130 at the three-phase output node determines the speed of APU engine 84. Once the APU engine speed increases to a predetermined speed, the alternator/starter 86 switches to the battery charging power loop 512 so that the inverter 130 converts the AC currents from the three alternator/starter phases 514 to DC current for charging the batteries.

Figure 13:
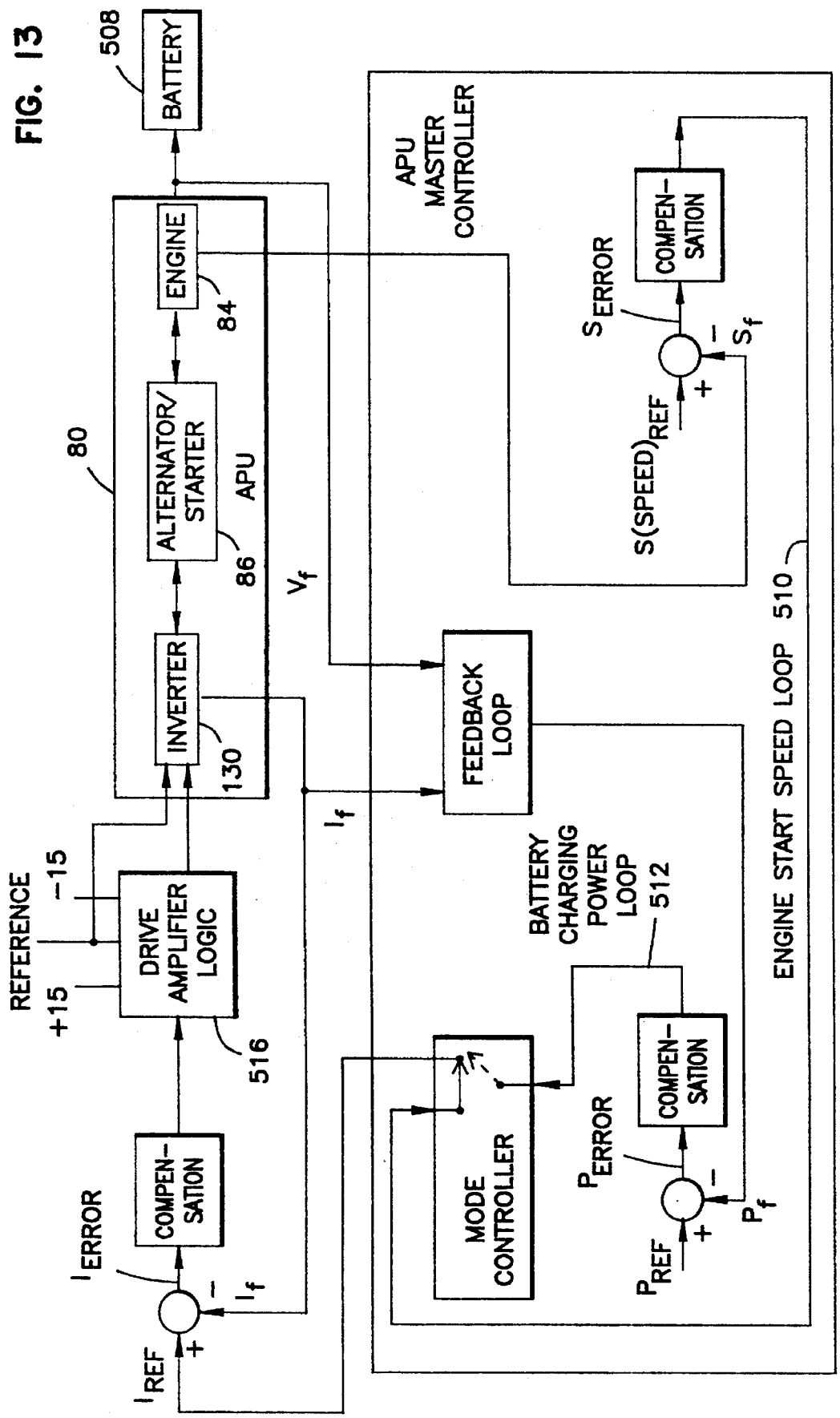
FIG. 13 is a block diagram of the battery charging system.

The APU Master Control Unit 518 controls the APU master control unit 518 and engine starting system. FIG. 13 shows a block diagram of the APU master control unit 518 which is controlled by the APU Master Control Unit 518. The battery charging procedures are as follows:

1) The APU Master Control Unit 518 sends a command to the inverter 130 to set the common node A a positive DC current, set the common node B a negative DC current, and set the common node C to zero current. Thus, the position of the APU engine crankshaft 90 is switched to a known position which is sensed by an encoder sensor (not shown) mounted on the crankshaft 90. The DC current is large enough to force the crankshaft 90 to the desired position in the presence of friction forces.

2) The APU Master Control Unit 518 sends an $S_{ref}$ signal to command the engine start speed loop of the APU master control unit 518. The drive amplifier system 516 sends logic signals to the six inverter 130 switches. The inverter 130 then converts the batteries' DC voltage to AC voltage so as to drive the alternator/starter 86 crankshaft.

3) When the engine fires and speeds the crankshaft up to exceed 600 rpm (for example), the APU master controller disconnects the engine start speed loop 510 (a). The battery charging power loop 512 (b) is connected but is commanded to provide zero power until the crankshaft speed reaches command speed (5500 rpm (c) for example). DC voltage and current is used to provide the previous output power information. Therefore, when the vehicle's need for power changes, the difference between the present required power and the previous power can be determined, and the APU power provided can be adjusted accordingly. The APU engine speed may be varied if the battery charging power changes significantly.

In the embodiment; the vehicle batteries are 350 V. It is appreciated that voltage of the batteries can be chose by the industry requirement.

Additional alternator/starter specifications might include the following:

Type: Permanent Magnet

No. Poles: 12

Magnet: Neodymium Iron Boron, 27 Megagauss oerstad Energy Product

Winding: 3 Phase wye

Stator OD: 6.5 inches

Stator Material: M-19, 29 gauge electrical steel

Insulation/Tempo: Class H+, 125 degree Celsius maximum rise by resistance

It will be appreciated that the above is a detailed description of an embodiment of the alternator/starter 86 which might be used in the present invention. It will be appreciated that other embodiments of alternator/starters might be used with the present invention.

Vehicle Control System

Figure 11:
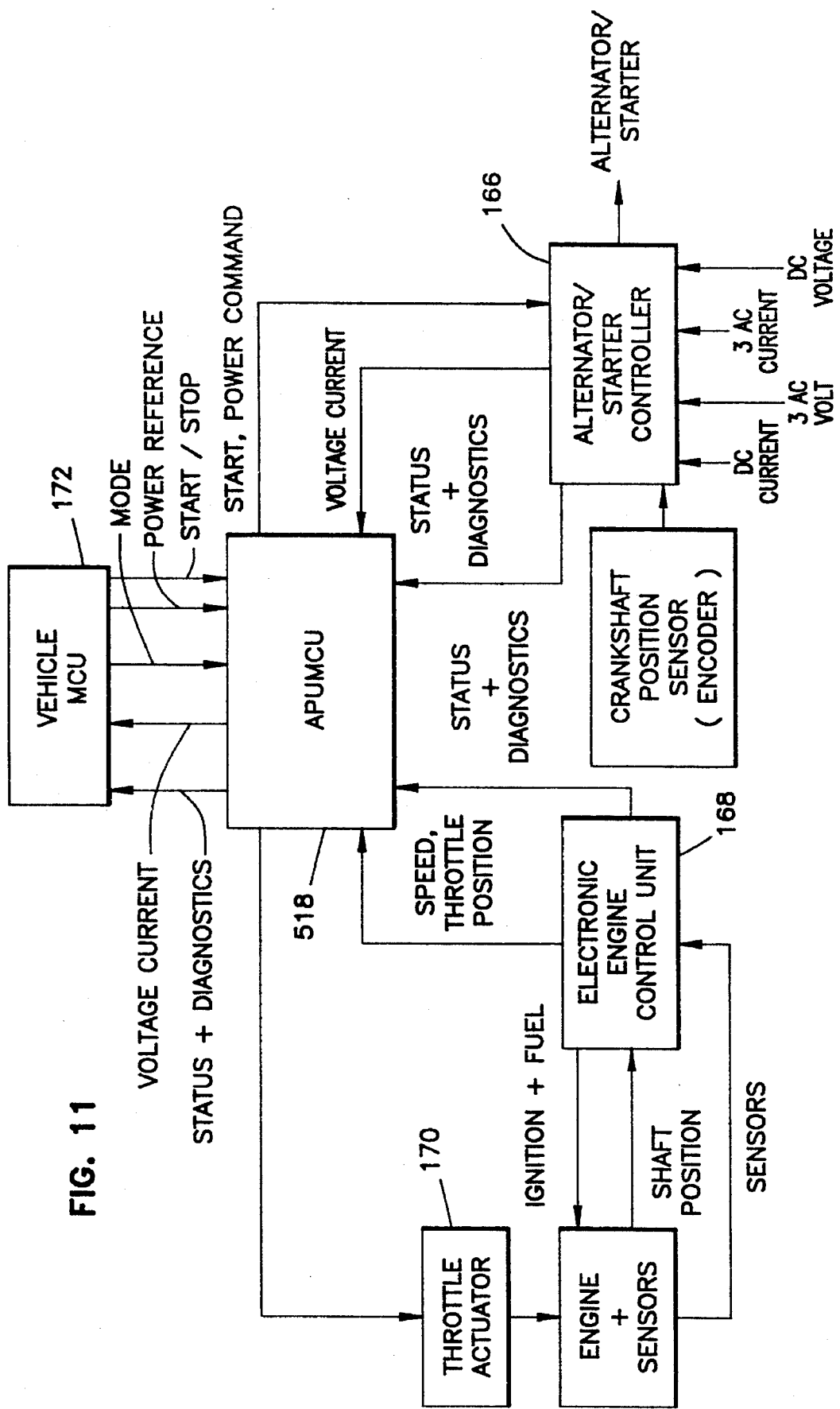
FIG. 11 is a block diagram of a hybrid electric vehicle control system.

As illustrated in FIG. 11, an Auxiliary Power Unit (APU) Master Control Unit 518, a permanent magnet Alternator/

Starter Controller 166, and an Electronic Engine Controller 168 are included in a vehicle control system 172. The APU Master Control Unit 518 is microprocessor based and is the APU coordinator communicating with the Electronic Engine Controller 168, the Alternator/Starter Controller 166, and a Throttle Actuator 170. In addition, the APU Master Control Unit 518 also communicates status back to the Master Control Unit 172 of the hybrid electric vehicle. Upon starting the vehicle, the vehicle Master Control Unit 172 sends a power-up command to the APU Master Control Unit 518. The APU Master Control Unit 518 initiates the engine start speed loop 110 and brings the engine 84 up to speed using an electronically actuated throttle plate (not shown). The vehicle Master Control Unit 172 establishes a desired power level and sends a power command to the APU Master Control Unit 518. The APU Master Control Unit 518 sends a power level command to the Alternator/Starter Controller 166 once the combustion engine 84 is up to a proper speed. Signals fed back from the Alternator/Starter Controller 166 to the APU Master Controller Unit 518 are voltage, current, operational status, and diagnostics information. Signals from the combustion engine 84 to the, APU Master Control Unit 518 via the Electronic Engine Controller 168 are engine crankshaft position, throttle position, operational status, and diagnostics information. Signals back from APU Master Control Unit 518 to the vehicle Master Control Unit 172 are voltage, current, operational status, and diagnostics information. Alternator/Starter and Engine Controller 166 commands from the APU Master Control Unit 518 are derived by a combination of look-up tables and controller logic.

The Electronic Engine Controller 168 works as it does in today's automobiles where the Electronic Engine Controller 168 controls engine operating parameters to ensure low emissions and maximum performance.

The Alternator/Starter Controller 166 is a three-phase inverter which provides cranking current and also controls the alternator/starter output power. The three phase inverter is bi-directional and will force the currents flowing in the three phases of the alternator/starter to be sinusoidal and in phase with the back emf for most situations. It may be necessary to vary the phase angle between the alternator/starter back emf and phase current depending on operating conditions. Filtering is provided on the DC output so inverter switching noise does not adversely affect the electrical traction drive or batteries. The Alternator/Starter Controller 166 is self protecting against i) over voltage, ii) under voltage, iii) over current, and iv) over temperature. It is fused on both the three-phase input and DC output to prevent destruction of other hybrid electric vehicle subsystems (e.g. batteries) in case of an internal fault.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An auxiliary power unit for a hybrid electric vehicle, comprising:

a combustion engine driving a crankshaft;

a balance shaft interconnected to the crankshaft by gear means for causing the balance shaft to rotate in a direction opposite to that of the crankshaft;

an alternator/starter mounted on an end of the balance shaft; and wherein a net angular momentum of the auxiliary power unit is zero.

2. An auxiliary power unit in accordance with claim 1, wherein the alternator/starter is taper fit to the balance shaft.

3. An auxiliary power unit in accordance with claim 1, wherein the gear means includes a planetary gear assembly.

* * * * *

UNITED STATES PATENT AND TRADEMARK OFFICE
CERTIFICATE OF CORRECTION

PATENT NO. : 5,469,820

DATED : November 28, 1995

INVENTOR(S) : Stanley E. Data

It is certified that error appears in the above-identified patent and that said Letters Patent is hereby corrected as shown below:

```
     In the title page, in Section [75] Inventors:  please delete
the following:  "Robert P. Koziara, Lake Elmo; Mark S. Lent,
Brooklyn Park; Patrick A. O'Gorman, Brooklyn Center; Thomas K.
Rose, Plymouth; Eugene G. Shanks, Blaine; Daniel A. Norrick, Anoka,
all of"
```

Signed and Sealed this

Eighth Day of October, 1996

Attest:

BRUCE LEHMAN

*Attesting Officer*      *Commissioner of Patents and Trademarks*